A system is provided, including: a peripheral device having a plurality of electromagnets; a glove interface object, the glove interface object having one or more magnetic sensors configured to sense magnetic fields generated by the electromagnets to determine a location of the glove interface object in an interactive environment, the glove interface object further having one or more inertial sensors configured to detect an orientation of the glove interface object.

United States Patent
Osman

(10) Patent No.: US 10,254,833 B2
(45) Date of Patent: *Apr. 9, 2019

(54) MAGNETIC TRACKING OF GLOVE INTERFACE OBJECT

(71) Applicant: Sony Interactive Entertainment Inc., Tokyo (JP)

(72) Inventor: Steven Osman, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 47 days.

This patent is subject to a terminal disclaimer.

(21) Appl. No.: 15/474,671

(22) Filed: Mar. 30, 2017

(65) Prior Publication Data
US 2017/0205880 A1    Jul. 20, 2017

Related U.S. Application Data

(63) Continuation of application No. 14/687,527, filed on Apr. 15, 2015, now Pat. No. 9,652,038.

(60) Provisional application No. 62/118,734, filed on Feb. 20, 2015.

(51) Int. Cl.
*G06F 3/01* (2006.01)
*A63F 13/212* (2014.01)
*G06F 3/0346* (2013.01)

(52) U.S. Cl.
CPC ........... *G06F 3/014* (2013.01); *A63F 13/212* (2014.09); *G06F 3/0346* (2013.01); *A63F 2300/1012* (2013.01)

(58) Field of Classification Search
CPC ...... G06F 3/014; G06F 3/0346; A63F 13/212; A63F 13/20
See application file for complete search history.

(56) References Cited

U.S. PATENT DOCUMENTS

| 4,510,939 A | 4/1985 | Brenman et al. |
| 5,184,319 A | 2/1993 | Kramer |
| 5,481,265 A | 1/1996 | Russell |
| 5,581,484 A | 12/1996 | Prince |
| 5,742,263 A | 4/1998 | Wang et al. |
| 6,128,004 A | 10/2000 | McDowall et al. |

(Continued)

FOREIGN PATENT DOCUMENTS

| EP | 2418562 A1 | 2/2012 |
| WO | WO 2002037466 A1 | 5/2002 |

OTHER PUBLICATIONS

Utsumi, A., et al., "Hand gesture recognition system using multiple cameras", Pattern Recognition, 1996., Proceedings of the 13th International Conference on Year: 1996, vol. 1 pp. 667-671 vol. 1 , 001: 10.11 09/ICPR.1996.5461 08.

(Continued)

*Primary Examiner* — Rodney Amadiz
(74) *Attorney, Agent, or Firm* — Penilla IP, APC

(57) ABSTRACT

18 Claims, 15 Drawing Sheets

(56) References Cited

U.S. PATENT DOCUMENTS

| | | |
|---|---|---|
| 6,304,840 B1 | 10/2001 | Vance et al. |
| 6,380,923 B1 | 4/2002 | Fukumoto et al. |
| 6,515,669 B1 | 2/2003 | Mohrl |
| 6,598,793 B1 | 7/2003 | Fisher et al. |
| 6,618,689 B2 | 9/2003 | Knorpp et al. |
| 6,806,863 B1 | 10/2004 | Howard |
| 6,965,374 B2 | 11/2005 | Villet et al. |
| 7,038,658 B2 | 5/2006 | Seki et al. |
| 7,381,884 B1 | 6/2008 | Atakhanian |
| 7,405,725 B2 | 7/2008 | Mohrl |
| 7,565,295 B1 | 7/2009 | Hernandez-Rebollar |
| 7,753,845 B2 | 7/2010 | Gopinathan et al. |
| 7,842,879 B1 | 11/2010 | Carter |
| 7,944,616 B2 | 5/2011 | Mukawa |
| 8,022,925 B2 | 9/2011 | Lee et al. |
| 8,279,091 B1 | 10/2012 | Tran et al. |
| 8,362,350 B2 | 1/2013 | Kockovic |
| 8,421,448 B1 | 4/2013 | Tran et al. |
| 8,620,661 B2 | 12/2013 | Ramstrum |
| 8,743,052 B1 | 6/2014 | Keller et al. |
| 8,971,572 B1 | 5/2015 | Yin et al. |
| 9,104,271 B1 | 8/2015 | Adams et al. |
| 9,189,022 B2 | 11/2015 | Burgess |
| 2001/0010598 A1 | 8/2001 | Aritake et al. |
| 2001/0040550 A1 | 11/2001 | Vance et al. |
| 2004/0012559 A1 | 1/2004 | Seki et al. |
| 2004/0255361 A1 | 12/2004 | Senter et al. |
| 2005/0041016 A1 | 2/2005 | Howard |
| 2005/0264527 A1 | 12/2005 | Lin |
| 2006/0129070 A1 | 6/2006 | Pearl et al. |
| 2007/0058261 A1 | 3/2007 | Sugihara et al. |
| 2007/0220108 A1 | 9/2007 | Whitaker |
| 2007/0259716 A1 | 11/2007 | Mattice et al. |
| 2008/0216207 A1 | 9/2008 | Tsai |
| 2009/0054077 A1 | 2/2009 | Gauthier et al. |
| 2009/0212979 A1 | 8/2009 | Catchings et al. |
| 2010/0023314 A1 | 1/2010 | Hernandez-Rebollar |
| 2010/0096193 A1 | 4/2010 | Yilmaz et al. |
| 2011/0260963 A1 | 10/2011 | Timmons |
| 2012/0117514 A1 | 5/2012 | Kim et al. |
| 2012/0157263 A1 | 6/2012 | Sivak et al. |
| 2012/0319940 A1 | 12/2012 | Bress et al. |
| 2013/0172906 A1* | 7/2013 | Olson .............. A61B 34/71 606/130 |
| 2013/0241927 A1 | 9/2013 | Vardi |
| 2013/0265300 A1 | 10/2013 | Vardi |
| 2014/0176819 A1 | 6/2014 | Yilmaz |
| 2014/0204019 A1 | 7/2014 | Kihara |
| 2014/0267024 A1 | 9/2014 | Keller et al. |
| 2014/0349256 A1 | 11/2014 | Connor |
| 2015/0140934 A1 | 5/2015 | Abdurrahman et al. |
| 2015/0153950 A1 | 6/2015 | Chang et al. |
| 2015/0249819 A1 | 9/2015 | Jiang |
| 2015/0253847 A1 | 9/2015 | Harris et al. |
| 2015/0290795 A1 | 10/2015 | Oleynik |
| 2015/0371083 A1 | 12/2015 | Csaszar et al. |
| 2016/0026253 A1 | 1/2016 | Bradski et al. |
| 2016/0054797 A1 | 2/2016 | Tokubo et al. |
| 2016/0187973 A1 | 6/2016 | Shankar et al. |
| 2016/0246369 A1 | 8/2016 | Osman |
| 2016/0246370 A1 | 8/2016 | Osman |

OTHER PUBLICATIONS

Oda, S., et al., "Development of a glove-type interface for data manipulation of the virtual environment in the operating room", Engineering in Medicine and Biology Society, 1998. Proceedings of the 20th Annual International Conference of the IEEE Year: 1998, vol. 3.

Oka, K, et al. Real-time fingertip tracking and gesture recognition, IEEE Computer Graphics and Applications Year: 2002, vol. 22, Issue: 6.

Fahn et al., "Development of a Fingertip Glove Equipped with Magnetic Tracking Sensors", Sensors 2010, www.mdpi.com/journal/sensors, Jan. 29, 2010, National Taiwan Univeristy of Science and Technology, Taipei, Taiwan, 22 pages.

Tongrod, N. et al., "A low-cost data-glove for human computer interaction based on ink-jet printed sensors and Zig Bee networks," in Proc. Int. Symp. Wearable Comput., Seoul, South Korea, Oct. 10-13, 2010, pp. 1-2.

Saggio, Giovanni et al., "A data glove based sensor interface to expressively control musical processes", Advances in Sensors and Interfaces (IWASI), 2011 4th IEEE International Workshop on Year: 2011.

Yamamoto, Sanshiro et al., "A Study for Vision Based Data Glove Considering Hidden Fingertip with Self-Occlusion", Software Engineering, Artificial Intelligence, Networking and Parallel & Distributed Computing (SNPD), 2012 13th ACIS International Conference on Year: 2012

Muruamatsu, Yuichi et al., "Perception of tactile sensation using vibrotactile glove interface" ; Cognitive Infocommunications (CogInfoCom), 2012 IEEE 3rd International Conf. on Year: 2012.

Mikhaylov, Konstantin et al., "Wireless sensor glove interface and its application in digital holography", Cognitive Infocommunications (CogInfoCom), 2013 IEEE 4th International Conference on Year: 2013.

Moreira, et al., "Real-time hand tracking for rehabilitation and character animation", Barcelos, Portugal, 978-1-4799-4823-9/14, 2014 IEEE, 7 pages.

International Search Report and Written Opinion from corresponding International Patent Application No. PCT/US2016/018738, dated May 18, 2016 (16 total pages).

International Search Report and Written Opinion from related International Patent Application No. PCT/US2016/018743, dated May 27, 2016 (17 total pages).

* cited by examiner

MAGNETIC TRACKING OF GLOVE INTERFACE OBJECT

CLAIM OF PRIORITY

This application claims priority to U.S. application Ser. No. 14/687,527, filed Apr. 15, 2015, entitled "Magnetic Tracking of Glove Fingertips," which claims priority to U.S. Provisional Application No. 62/118,734, filed Feb. 20, 2015, entitled "Magnetic Tracking of Glove Fingertips," the disclosure of which is incorporated by reference herein.

RELATED APPLICATIONS

This application is related to U.S. application Ser. No. 14/687,543, filed Apr. 15, 2015, entitled "Magnetic Tracking of Glove Fingertips with Peripheral Devices," and to U.S. application Ser. No. 14/517,741, filed Oct. 17, 2014, entitled "Glove Interface Object," and to U.S. application Ser. No. 14/517,733, filed Oct. 17, 2014, entitled "Thumb Controller," the disclosures of which are incorporated by reference herein.

BACKGROUND

1. Field of the Invention

The present invention relates to magnetic tracking of glove fingertips and associated methods and systems.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), Sony Playstation3® (PS3), and Sony Playstation4® (PS4), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

Another growing trend in the industry involves the development of cloud-based gaming systems. Such systems may include a remote processing server that executes a game application, and communicates with a local thin client that can be configured to receive input from users and render video on a display.

It is in this context that embodiments of the invention arise.

SUMMARY

Embodiments of the present invention provide for magnetic tracking of glove fingertips and associated methods and systems.

Broadly speaking a magnetic tracking system to track fingertips and knuckles is provided to create an input device that captures hand/finger pose. In one embodiment, a number of magnetic sensors (e.g. Hall effect sensors) are placed on the hand (e.g. one per fingertip), and three spatially separated electromagnets are placed on the wrists. The electromagnets can be cycled in turn to allow the sensors to make separate readings from each one, and then the three readings per sensor can be used to compute a three-dimensional (3D) position of the fingertip relative to the wrist. Given the 3D position of the fingertip, then it is possible to use inverse kinematics to reduce the pose of the finger (e.g. identify which knuckles are bent and the amount of bending) to one possible configuration (or several almost identical configurations). Additionally, magnetic emitters can be placed in other devices, such as a physical controller device, and may be used with the fingertip sensors to determine their pose relative to these devices, to show proper interplay between the hand and the device (e.g. a user can be provided with a display rendering that shows their hand grasping a controller device).

In one embodiment, a glove interface object is provided, comprising: a plurality of electromagnets positioned at a wrist area of the glove interface object; a plurality of magnetic sensors respectively positioned at fingertip areas of the glove interface object, wherein each magnetic sensor is configured to generate data indicating distances to each of the electromagnets when each of the electromagnets is activated; a controller configured to control activation of the electromagnets and reading of the magnetic sensors in a time-division multiplexed arrangement, wherein each of the magnetic sensors is read during activation of a single electromagnet; a transmitter configured to transmit data derived from the reading of the magnetic sensors to a computing device for processing to generate data representing a pose of a virtual hand, the virtual hand capable of being rendered in a virtual environment presented on a head-mounted display.

In one embodiment, the time-division multiplexed arrangement is defined by a repeated pattern of activation of the electromagnets that provides for activation of each of the electromagnets during separate time periods, and reading of each of the magnetic sensors during the time period of activation of a given one of the electromagnets.

In one embodiment, the plurality of electromagnets defines at least three electromagnets that are positioned on the wrist area in a non-collinear arrangement.

In one embodiment, the plurality of magnetic sensors defines five magnetic sensors respectively positioned at five fingertip areas of the glove interface object.

In one embodiment, each of the plurality of magnetic sensors is configured to generate a voltage in response to a magnetic field generated by one of the electromagnets.

In one embodiment, the glove interface object further comprises: an illuminated trackable object that is configured to be tracked based on analysis of captured images of the glove interface object in an interactive environment, the tracking of the illuminated trackable object defining a location of the virtual hand in a virtual environment.

In one embodiment, the glove interface object further comprises: at least one inertial sensor selected from the group consisting of an accelerometer, a gyroscope, and a magnetometer.

In another embodiment, a method is provided, comprising: serially activating and deactivating a plurality of electromagnets that are positioned at a wrist portion of a glove interface object, so as to define periods of activation for each of the electromagnets that are substantially non-overlapping; during the activation of each one of the electromagnets, using a plurality of magnetic sensors to sense a strength of a magnetic field generated by the electromagnet that is activated, the plurality of magnetic sensors being respectively positioned at fingertip portions of the glove interface object; processing the sensed strengths of the magnetic fields to generate data derived from the sensed strengths of the magnetic fields; sending the data derived from the sensed strengths of the magnetic fields to a computing device for processing generate data representing a pose of a virtual hand, the virtual hand capable of being rendered in a virtual environment presented on a head-mounted display, such that the pose of the virtual hand is substantially similar to a physical pose of the glove interface object.

In one embodiment, processing the sensed strengths of the magnetic fields includes determining distances from each of the magnetic sensors to each of the electromagnets, and determining a relative location of each magnetic sensor to the plurality of electromagnets based on the determined distances.

In one embodiment, the processing to define the pose of the virtual hand includes processing the relative location of each magnetic sensor to define a pose for a corresponding virtual finger on the virtual hand.

In one embodiment, the plurality of electromagnets includes at least three electromagnets positioned on the wrist portion of the glove interface object in a non-collinear arrangement.

In one embodiment, the relative location of a given magnetic sensor to the plurality of electromagnets is defined by an intersection of radii, the radii having origins defined by each of the electromagnets and magnitudes defined by the determined distances from the given magnetic sensor to each of the electromagnets.

In one embodiment, serially activating and deactivating the plurality of electromagnets defines a repetitive cycle of the periods of activation of the electromagnets.

In one embodiment, each of the plurality of magnetic sensors is configured to generate a voltage in response to a magnetic field generated by one of the electromagnets.

In another embodiment, a method is provided, comprising: activating a first electromagnet positioned on a wrist portion of a glove interface object, the activation of the first electromagnet producing a first magnetic field; measuring a strength of the first magnetic field at each of a plurality of fingertip portions of the glove interface object; deactivating the first electromagnet; activating a second electromagnet positioned on the wrist portion of the glove interface object, the activation of the second electromagnet producing a second magnetic field; measuring a strength of the second magnetic field at each of the plurality of fingertip portions of the glove interface object; deactivating the second electromagnet; activating a third electromagnet positioned on a wrist portion of the glove interface object, the activation of the third electromagnet producing a third magnetic field; measuring a strength of the third magnetic field at each of the plurality of fingertip portions of the glove interface object; deactivating the third electromagnet; for each of the fingertip portions of the glove interface object, generating location data that indicates a location of the fingertip portion based on the measured strength of the first, second, and third magnetic fields at the fingertip portion; sending the location data to a computing device for processing to generate data representing a configuration of a virtual hand, the virtual hand capable of being rendered in a virtual environment presented on a head-mounted display, such that the configuration of the virtual hand is substantially similar to a physical configuration of the glove interface object.

In one embodiment, the activating and deactivating of the first electromagnet defines a period of activation for the first electromagnet during which the measuring of the strength of the first magnetic field is performed; wherein the activating and deactivating of the second electromagnet defines a period of activation for the second electromagnet during which the measuring of the strength of the second magnetic field is performed; wherein the activating and deactivating of the third electromagnet defines a period of activation for the third electromagnet during which the measuring of the strength of the third magnetic field is performed; wherein the periods of activation for the first, second, and third electromagnets are substantially non-overlapping.

In one embodiment, the method further comprises: cyclically performing each of the operations of the method, so as to provide real-time correspondence between the configuration of the virtual hand and the physical configuration of the glove interface object.

In one embodiment, the location of a given fingertip portion is defined by an intersection of radii, the radii having origins defined by each of the electromagnets and magnitudes defined by distances from the given fingertip portion to each of the electromagnets that are determined from the measured strengths of the magnetic fields.

In one embodiment, the first, second, and third electromagnets are positioned on the wrist portion of the glove interface object in a non-collinear arrangement.

In one embodiment, measuring the strength of the magnetic fields at each of the plurality of fingertip portions is performed by Hall effect sensors positioned at the plurality of fingertip portions.

In another embodiment, a method is provided, comprising: using an image capture device to capture images of an interactive environment; processing the captured images to track a location of a trackable object on a glove interface object in the interactive environment, the tracked location of the trackable object defining a location of a virtual hand in a virtual environment; receiving finger proximity data from a plurality of proximity sensors positioned at fingertip portions of the glove interface object, the finger proximity data indicating distances to each of a plurality of emitters positioned on the glove interface object; processing the proximity data to identify locations of the fingertip portions relative to the emitters; applying the locations of the fingertip portions to define poses of virtual fingers of the virtual hand in the virtual environment for rendering on a head-mounted display.

In one embodiment, receiving finger proximity data is defined from activation of the emitters and reading of the proximity sensors in a time-division multiplexed arrangement, wherein each of the proximity sensors is read during activation of a single emitter, wherein the time-division multiplexed arrangement is defined by a repeated pattern of activation of the emitters that provides for activation of each of the emitters during separate time periods, and reading of each of the proximity sensors during the time period of activation of a given one of the emitters.

In one embodiment, the plurality of emitters defines at least three electromagnets that are positioned on a wrist portion of the glove interface object in a non-collinear arrangement.

In one embodiment, the plurality of proximity sensors defines five magnetic sensors respectively positioned at five fingertip portions of the glove interface object.

In one embodiment, the trackable object is illuminated to facilitate identification in the captured images.

In one embodiment, the method further comprises: receiving orientation data from an orientation sensor defined on the glove interface object; processing the orientation data to define an orientation of the virtual hand in the virtual environment.

In one embodiment, the orientation sensor is selected from the group consisting of an accelerometer, a gyroscope, and a magnetometer.

In another embodiment, a method is provided, comprising: activating a plurality of glove emitters positioned on a glove interface object; using a plurality of proximity sensors positioned at fingertip portions of the glove interface object to determine a proximity of the fingertip portions to the glove emitters; in response to determining a location of the glove interface object within a predefined distance of a peripheral device, activating a plurality of peripheral emitters positioned at the peripheral device, and transitioning, from using the proximity sensors to determine the proximity of the fingertip portions to the glove emitters, to using the proximity sensors to determine a proximity of the fingertip portions to the peripheral emitters.

In one embodiment, transitioning includes terminating the activation of the glove emitters.

In one embodiment, activating the glove emitters defines a cyclical activation sequence of the glove emitters, wherein during a single activation time period for a given glove emitter, proximity data is read from each of the proximity sensors.

In one embodiment, determining the location of the glove interface object within the predefined distance of the peripheral device includes processing captured image data of an interactive environment to identify the location of the glove interface object and a location of the peripheral device.

In one embodiment, determining the location of the glove interface object includes activating a secondary peripheral emitter on the peripheral device, and using the proximity sensors to determine a proximity of the fingertip portions to the secondary peripheral emitter; and, wherein transitioning includes terminating the activation of the secondary peripheral emitter.

In one embodiment, the glove emitters are positioned at a wrist portion of the glove interface object.

In one embodiment, the glove emitters and the peripheral emitters are defined by electromagnets, and the proximity sensors are defined by magnetic sensors.

In another embodiment, a system for interfacing with an interactive application is provided, comprising: a glove interface object, the glove interface object including, a plurality of glove emitters, a plurality of proximity sensors positioned at fingertip portions of the glove interface object, the proximity sensors being configured to indicate a proximity of the fingertip portions to the glove emitters, a glove controller configured to control activation of the plurality of glove emitters and reading of the proximity sensors; and, a peripheral device, the peripheral device including, a plurality of peripheral emitters, a peripheral controller configured to activate the peripheral emitters in response to a location of the glove interface object being determined within a predefined distance of the peripheral device; wherein the proximity sensors, further in response to the location of the glove interface object being determined within the predefined distance, transition, from indicating the proximity of the fingertip portions to the glove emitters, to indicating a proximity of the fingertip portions to the peripheral emitters.

In one embodiment, the glove controller is configured to terminate the activation of the glove emitters in response to the location of the glove interface object being determined within the predefined distance.

In one embodiment, the glove controller is configured to define a cyclical activation sequence of the glove emitters, wherein during a single activation time period for a given glove emitter, proximity data is read from each of the proximity sensors.

In one embodiment, the peripheral device further includes, a secondary peripheral emitter, wherein the peripheral controller is configured to control the activation of the secondary peripheral emitter, the peripheral emitter being used for determining the location of the glove interface object; wherein the glove controller is configured to read the proximity sensors to determine a proximity of the fingertip portions to the secondary peripheral emitter that defines the location of the glove interface object; and wherein the peripheral controller is configured, further in response to the location of the glove interface object being determined within the predefined distance, to terminate activation of the secondary peripheral emitter.

In one embodiment, the glove emitters are positioned at a wrist portion of the glove interface object.

In one embodiment, the glove emitters and the peripheral emitters are defined by electromagnets, and the proximity sensors are defined by magnetic sensors.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Figure 1:
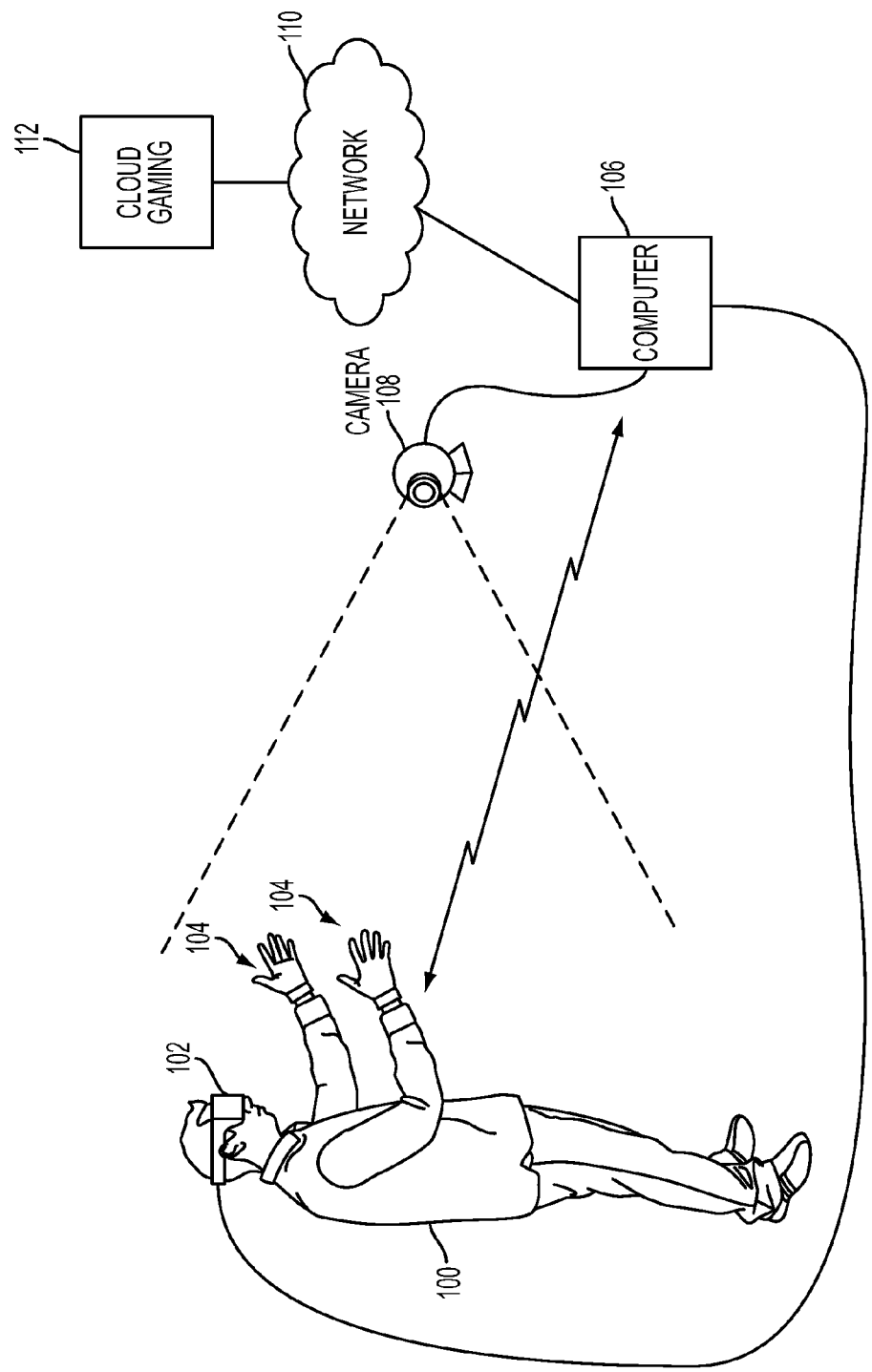
FIG. 1 illustrates a system for interactive gameplay of a video game, in accordance with an embodiment of the invention.

The following embodiments provide a glove interface object and associated systems, methods, and apparatuses.

In one embodiment, the methods, systems, image capture objects, sensors and associated interfaces objects (e.g., gloves) are configured to process data that is configured to be rendered in substantial real time on a display screen. For example, when a user's hand changes positions (e.g., the hand moves, fingers bend, multiple fingers bend, fingers touch other fingers and/or gestures are made), the changes in positions are configured to be displayed in substantial real time on a display.

The display may be the display of a head mounted display (HMD), a display of a second screen, a display of a portable device, a computer display, a display panel, a display of a remotely connected users (e.g., whom may be viewing content or sharing in an interactive experience), or the like. In some embodiments, the captured positions of the user's hand, the pressures sensed, the fingers touched, and/or the hand/finger gestures are used to interact in a video game, in a virtual world scene, a shared virtual space, a video game character, a character that is an extension of the real-world user, or simply provide a way of touching, holding, playing, interfacing or contacting virtual objects shown on a display screen or objects associated with documents, text, images, and the like.

In still other embodiments, virtual gloves may be worn by multiple users in a multi-user game. In such examples, each user may use one or two gloves. The users may be co-located or interfacing in a shared space or shared game from remote locations using a cloud gaming system, networked device and/or social networked collaboration space. In some embodiments, a glove may be used by one or more remote users to interact in a collaborative way to examine documents, screens, applications, diagrams, business information, or the like. In such an implementation, users collaborating may use their gloves to touch objects, move objects, interface with surfaces, press on objects, squeeze objects, toss objects, make gesture actions or motions, or the like.

During collaboration, movements made by one user's hand can appear to the other user as if a real user hand is moving things, objects, or making actions in the collaboration space. Still in a collaboration environment, if two remote users are examining documents, users wearing gloves can point at things on a virtual page, point and draw on a virtual whiteboard, lift and move virtual papers, shake hands, move items, etc. In some collaborative environments, one or more of the users may be wearing an HMD. When the HMD is used in conjunction with the glove or gloves (e.g., worn by one or more users), the users may see a virtual environment in which they can collaborate using their hands, such as moving objects, pages, objects, typing on virtual keyboards, moving virtual pages, tapping on things, pressing on things, etc.

Therefore, it should be understood that the uses of a glove that includes one or more sensors, and/or can detect pressure, and/or can detect bending position of fingers, and/or can detect orientation, and/or can detect inertial movement, etc., can provide for a broad scope of uses. Example uses, without limitation, may include video gaming, entertainment activities, sport related activities, travel and exploring related activities, human-to-human contact (e.g., shaking hands of a remote user), business activities, robotic control (e.g. robotic surgery), etc. In one implementation, this type of interactivity provided by a glove interface may be extended to additional sensors that may be attached or associated with other parts of the human body (e.g., an arm, a leg, a foot, etc.). In addition to gloves, different types of clothes are envisioned, e.g., jackets, pants, shoes, hats, etc.

It will be obvious, however, to one skilled in the art, that the present invention may be practiced without some or all of these specific details. In other instances, well known process operations have not been described in detail in order not to unnecessarily obscure the present invention.

FIG. 1 illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a glove interface object 104 to provide input for the video game. Additionally, a camera 108 can be configured to capture image of the interactive environment in which the user 100 is located. These captured images can be analyzed to determine the location and movements of the user 100, the HMD 102, and the glove interface object 104. In one embodiment, the glove interface object 104 includes a light which can be tracked to determine its location and orientation. Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the glove interface object 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the glove interface object 104.

In one embodiment, the HMD 102, glove interface object 104, and camera 108, may themselves be networked devices that connect to the network 110 to communicate with the cloud gaming provider 112. For example, the computer 106 may be a local network device, such as a router, that does not otherwise perform video game processing, but facilitates passage of network traffic. The connections to the network by the HMD 102, glove interface object 104, and camera 108 may be wired or wireless.

Additionally, though embodiments in the present disclosure may be described with reference to a head-mounted display, it will be appreciated that in other embodiments, non-head mounted displays may be substituted, including without limitation, a television, projector, LCD display screen, portable device screen (e.g. tablet, smartphone, laptop, etc.) or any other type of display that can be configured to render video and/or provide for display of an interactive scene or virtual environment in accordance with the present embodiments.

Figure 2:
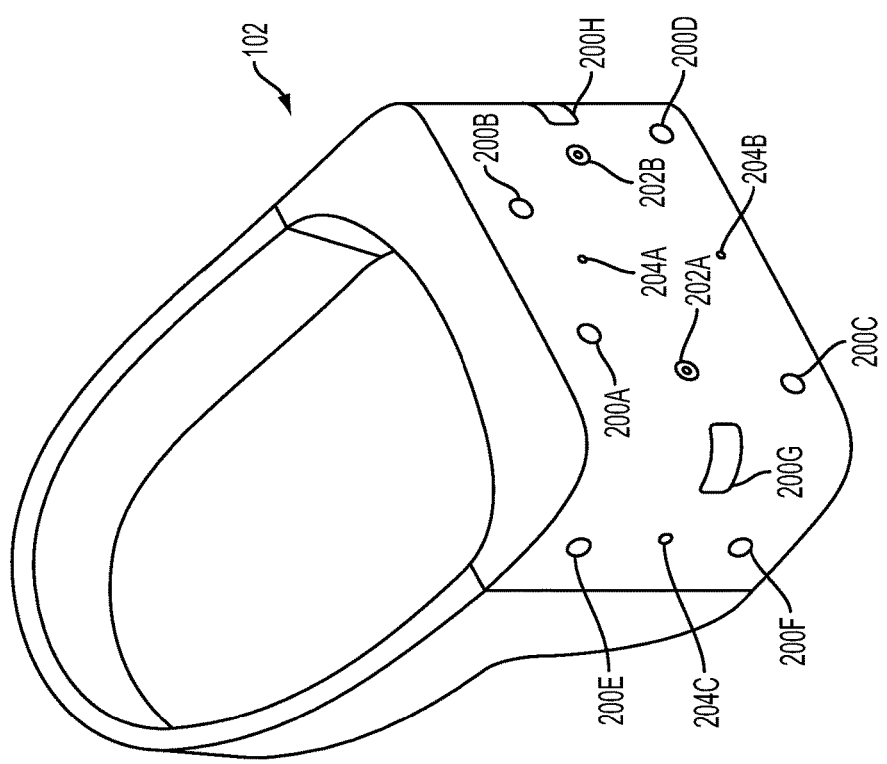
FIG. 2 illustrates a head-mounted display (HMD), in accordance with an embodiment of the invention.

FIG. 2 illustrates a head-mounted display (HMD), in accordance with an embodiment of the invention. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 3:
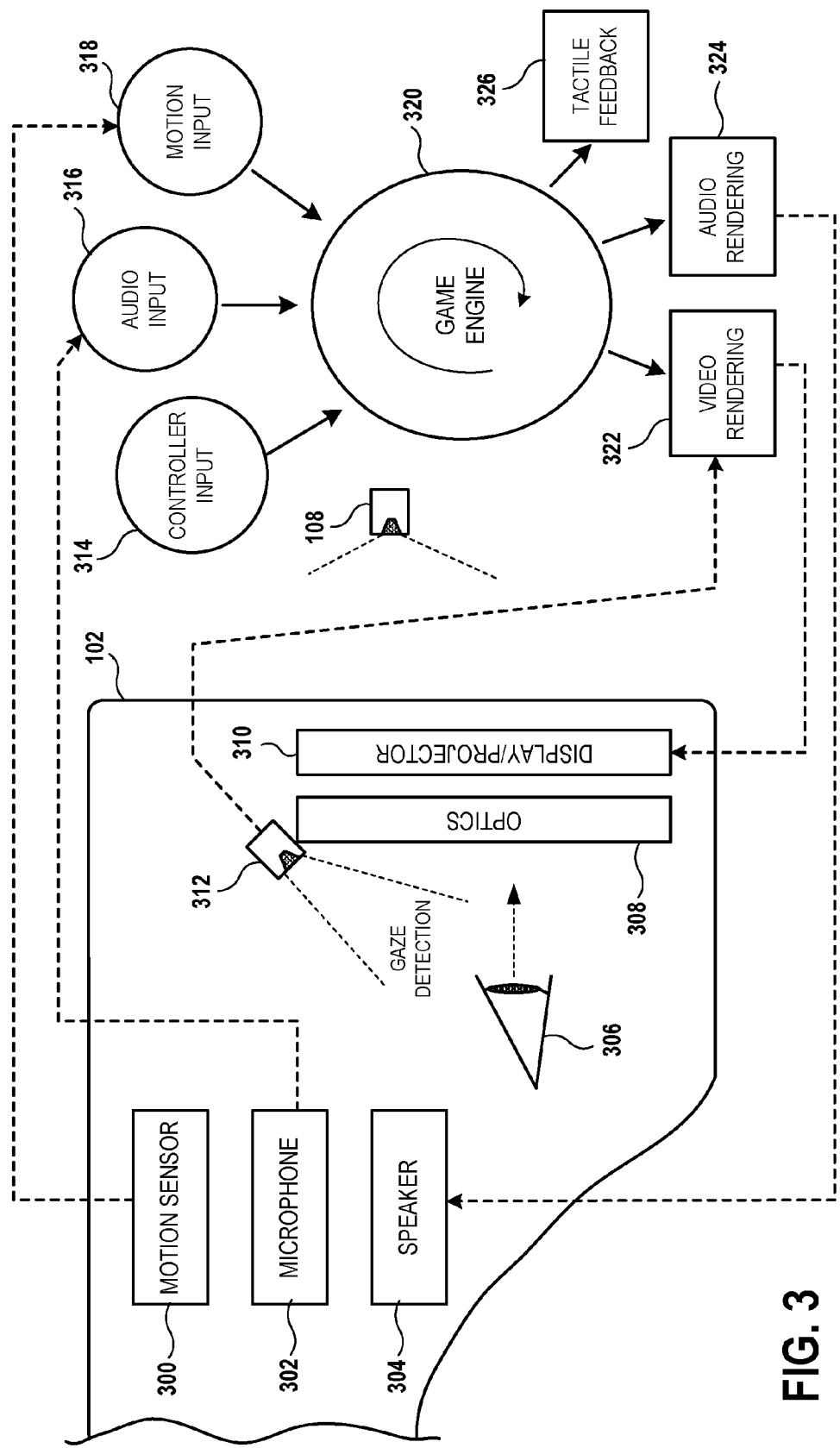
FIG. 3 conceptually illustrates the function of a HMD in conjunction with an executing video game, in accordance with an embodiment of the invention.

FIG. 3 conceptually illustrates the function of the HMD 102 in conjunction with an executing video game, in accordance with an embodiment of the invention. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as a handheld gaming controller (e.g. Sony DUALSHOCK®4 wireless controller, Sony Playstation®Move motion controller) or glove interface object 104. By way of example, controller input 314 may include directional inputs, button presses, trigger activation, movements, gestures, or other kinds of inputs processed from the operation of a gaming controller. The audio input 316 can be processed from a microphone 302 of the HMD 102, or from a microphone included in the image capture device 108 or elsewhere in the local environment. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

As has been noted, the HMD device described herein is capable of providing a user with a highly immersive experience, enveloping a large proportion or even an entirety of a user's field of vision. In light of this immersive aspect of the HMD experience, it is desirable to provide intuitive control mechanisms to the user, especially as the user may not be able to see their own hands or objects (e.g. controller) they are holding. Thus, in accordance with embodiments of the invention described herein, methods, apparatus, and systems are provided for a glove interface object.

Throughout the present disclosure, reference is made to the glove interface object and the user's hand, including the fingers, palm, and other portions thereof. For purposes of ease of description and readability of the present disclosure, it will be understood by those skilled in the art that the glove interface object and the user's hand (and/or portion thereof) may in many instances be referenced interchangeably and/or in the alternative. That is, an activity (e.g. pose, position, movement, orientation, location, action, etc.) defined by a user's hand, also pertains to the glove interface object that is being worn on the user's hand, as the glove interface object is configured to detect or facilitate detection of the activity of the user's hand. Therefore, it may be convenient for descriptive purposes to discuss certain aspects in the present disclosure utilizing language pertaining to the user's hand. However, it will be readily appreciated that the glove interface object is worn on the user's hand and that such may apply or in fact be defined by the glove interface object, this being apparent to those skilled in the art from the context of the description.

Figure 4A:
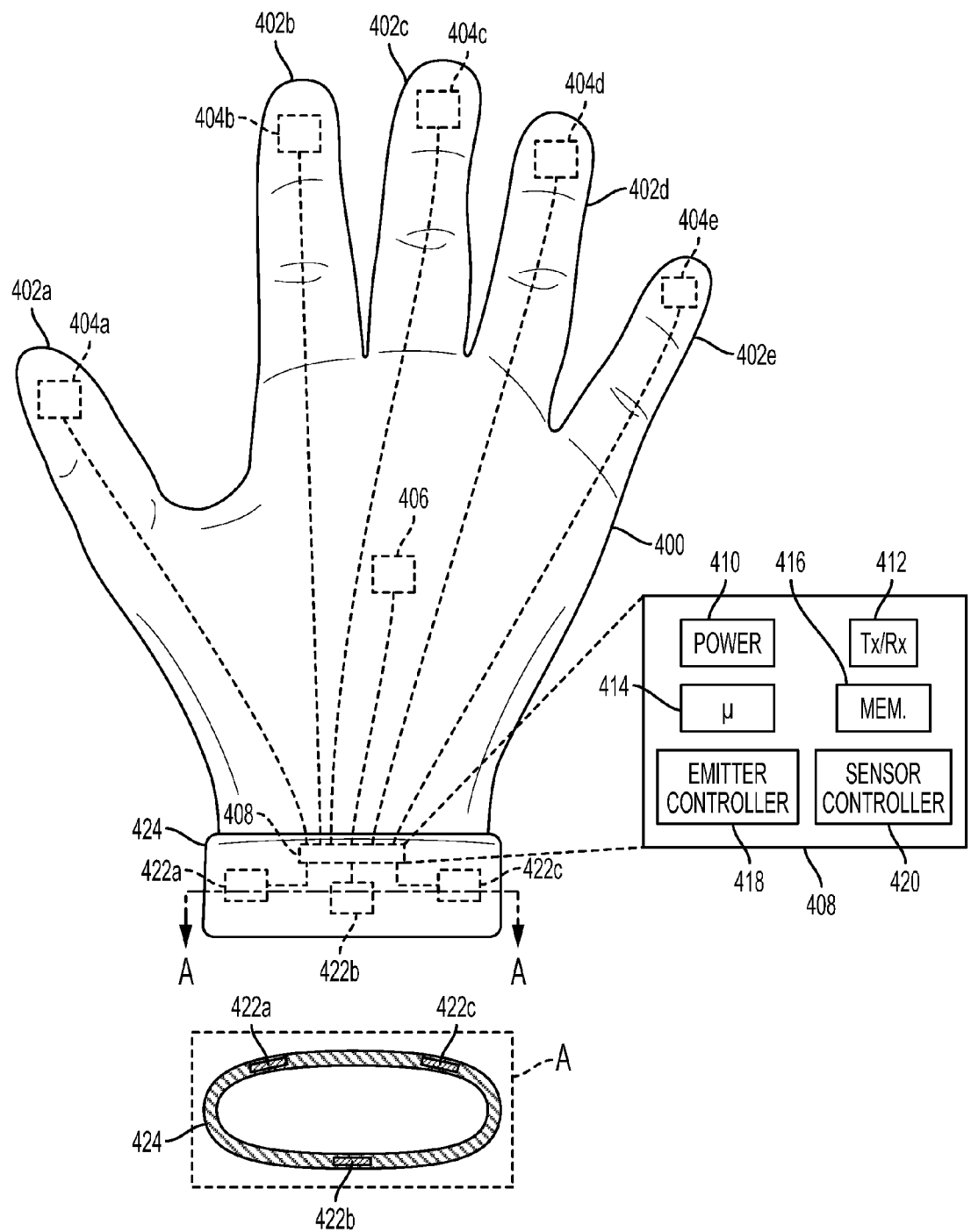
FIG. 4A illustrates a glove interface object having a plurality of emitters and proximity sensors defined thereon, in accordance with an embodiment of the invention.

FIG. 4A illustrates a glove interface object having a plurality of emitters and proximity sensors defined thereon, in accordance with an embodiment of the invention. As shown, the glove interface object 400 includes various finger portions, including a thumb portion 402a, and index finger portion 402b, a middle finger portion 402c, a ring finger portion 402d, and a pinky/little finger portion 402e. A plurality of proximity sensors are defined substantially at the fingertip portions/areas of the glove interface object 400. That is, the proximity sensors are defined on/in or otherwise at or near the end portions of the finger portions of the glove interface object 400 that correspond to or receive the distal phalanges portions of the user's fingers. In some implementations, the fingertip portions/areas correspond to some distal portion (e.g. distal half, distal third, distal quarter, etc.) of the distal phalanges, whereas in other implementations, the fingertip portions/areas correspond to the entire distal phalanges. The fingertip portion/area of a finger may include the top, bottom, sides, and/or end of the finger, and/or any sub-combination thereof. In the illustrated embodiment, proximity sensors 404a, 404b, 404c, 404d, and 404e are respectively defined at the fingertips/ends of the thumb portion 402a, index finger portion 402b, middle finger portion 402c, ring finger portion 402d, and little finger portion 402e. Additionally, a proximity sensor 406 is defined on a back portion or a palm portion of the glove interface object 400. The proximity sensors are configured to generate data indicating distance/proximity to each of a plurality of emitters 422a, 422b, and 422c.

In the illustrated implementation, the emitters are defined at a wrist portion 424 of the glove interface object 400. In some implementations, the wrist portion 424 is defined as a bracelet that surrounds the user's wrist when the glove interface object 400 is worn. The wrist portion 424 is configured to remain substantially stationary (e.g. have a stable orientation) with respect to the user's wrist/forearm, even as the remainder of the glove interface object 400, such as the finger portions and the palm portion, are moved in accordance with movements of the user's hand wearing the glove interface object 400. By maintaining the wrist portion 424 in a substantially stable orientation with respect to the user's wrist/forearm, then the emitters will also be maintained in a substantially stable orientation relative to the wrist/forearm, so that the proximity of the fingertip portions relative to the emitters can be consistently tracked and reliably indicate the proximity of the user's fingertips to his/her wrist/forearm.

In some implementations, the wrist portion 424 is configured to be positioned on the distal portion of the user's forearm. As used herein, the term "wrist" can include the distal portion of the forearm, in addition to the wrist joints which comprise the central part of the wrist. While the distal portion of the forearm is subject to pronation and supination movements, it is not subject to the other movements of the hand facilitated by the wrist joints, such as marginal movements including radial deviation and ulnar deviation, or flexion movements such as palmar flexion and dorsiflexion/extension. As such, by securing the wrist portion 424 to the distal portion of the forearm, it is possible for the emitters which are defined at the wrist portion 424 to serve as reference locations facilitating detection of changes resulting from the aforementioned movements of the hand which are facilitated by the wrist joints.

In various implementations, the wrist portion 424 can be secured to the wrist/forearm of the user (e.g. the distal end/portion of the forearm) by any known device, construction, or method which provides for secure placement of the wrist portion 424 so that the location/orientation of the wrist portion 424 is substantially unaffected by movements of the user's hand/fingers relative to the distal end/portion of the user's forearm. In some embodiments, the wrist portion 424 includes an elastic band for securing the wrist portion to the user's wrist/forearm. In some embodiments, the wrist portion 424 includes a clasp, buckle, tie, strap, or other mechanism for securing the wrist portion 424 to the user's wrist/forearm. In some embodiments, the mechanism can be adjustable to accommodate different sized wrists/forearms. In some embodiments, the interior surface of the wrist portion 424 is defined from a material providing for friction against the skin of the user's wrist/forearm to prevent the wrist portion 424 from slipping. In some embodiments, the interior surface may include a three-dimensional surface structure or patterning that is configured to prevent slippage, such as ribbing, dimples, etc.

In some implementations, the emitters are defined by electromagnets, and the proximity sensors are defined by magnetic sensors such as Hall effect sensors. Broadly speaking, a Hall effect sensor is a transducer that varies its output voltage in response to a magnetic field. A Hall effect sensor may consist of a rectangular p-type semiconductor material (e.g. gallium arsenide, indium antimonide, indium arsenide) through which a current is passed. When the sensor is placed within a magnetic field, the magnetic flux lines exert a force which deflects the charge carriers (electrons and holes) to either side of the semiconductor slab. The movement of charge carriers, resulting from the magnetic force they experience passing through the semiconductor material, causes a build-up of charge carriers producing a potential difference between the two sides of the semiconductor material. The output voltage (Hall voltage) is proportional to the strength of the magnetic field passing through the semiconductor material. A Hall effect sensor is one example of a magnetic sensor that may be utilized to detect a magnetic field. In other embodiments, other types of magnetic sensors which are capable of detecting and measuring a magnetic field may be utilized.

In some implementations, the emitters are defined by ultrasonic emitters and the proximity sensors are defined by microphones capable of detecting ultrasonic frequencies. In some implementations, the emitters are defined by RF emitters and the proximity sensors are defined by RF detectors. It will be appreciated that in various embodiments, the emitters and proximity sensors can be defined by any combination of emitters that emit signals and proximity sensors capable of detecting said signals, wherein the proximity sensors generate data based on the detected signals that indicates the proximity/distance of the proximity sensors to the emitters. Broadly speaking, embodiments discussed herein are described in terms of emitters that are defined by electromagnets and proximity sensors that are defined by magnetic sensors such as Hall effect sensors. However, it will be appreciated that in other embodiments, other types of emitters and proximity sensors may be substituted to achieve the same or similar functionality without departing from the scope of the present disclosure.

The glove interface object 400 includes a controller 408 that is configured to control the operation of the proximity sensors and the emitters. In the illustrated embodiment, the controller 408 is defined as part of the wrist portion 424, though in other embodiments, the controller 408 (or any of its specific subcomponents) can be located at different locations on or in the glove interface object 400. In one embodiment, the controller 408 includes various components, such as a power source 410 for providing power to operate the controller as well as the proximity sensors and emitters, a wired/wireless transceiver 412 for transmitting and receiving data with an external computing device such as a gaming console, a processor 414 for executing program instructions, a memory 416 for storing data and program instructions, an emitter controller 418 for controlling the operation of the emitters, and a sensor controller 420 for controlling the operation of the proximity sensors.

In some implementations, the controller 408 is configured to control the activation of the emitters and the reading of the proximity sensors in a time division multiplexed arrangement. That is, the emitters are serially activated and deactivated to define separate periods of activation for each emitter. During each period of activation for a given emitter, each of the proximity sensors can be read to obtain sensor data indicating the proximity/distance of each proximity sensor to the given emitter that is currently activated. The time division multiplexed arrangement will be more clearly understood through consideration of a specific example below.

With continued reference to FIG. 4A, in some implementations, the following time division multiplexed arrangement for control of the emitters and proximity sensors is utilized. During a first time period, the first emitter 422a is activated, and each of the proximity sensors is read; during a second time period that is successive to the first time period, the second emitter 422b is activated, and each of the proximity sensors is read a second time; and during a third time period that is successive to the second time period, the third emitter 422c is activated, and each of the proximity sensors is read a third time. This sequence of activation of the emitters can be repeated in a cyclical fashion to define a cycle/sequence of activation periods of the emitters. It will be understood that in some implementations, each activation time period for a given emitter is substantially exclusive of other activation time periods for the other emitters. In other words, the activation time periods for the emitters do not substantially overlap with one another. However, it will be appreciated that in some embodiments, there may be an overlap between the activations of the emitters. For example, as one emitter is being deactivated, the next emitter may be simultaneously activated, and thus an overlap between the activation time periods of both emitters may exist (e.g. possibly due to inductance in coils of the electromagnets). In some implementations, such an arrangement can be configured to be substantially nonoverlapping, wherein the time when a given emitter is exclusively activated is substantially greater than the time that it overlaps with another emitter, and the reading of the proximity sensors occurs during this exclusive activation time. In other implementations, the arrangement may be configured to be substantially overlapping. It will be appreciated that in various embodiments, the amount of overlap may vary, provided that the sequence of activation of the emitters provides each of the emitters to be exclusively activated at different times, as the proximity sensors are read during the exclusive activation times of each emitter.

For example, in implementations wherein the emitters comprise electromagnets and the proximity sensors comprise magnetic sensors such as Hall effect sensors, then the deactivation of one electromagnet may coincide with or overlap with the simultaneous activation of another electromagnet. In this manner, time is saved during the activation/deactivation times of the electromagnets, so as to minimize the amount of time spent transitioning from an activated state of one electromagnet to an activated state of a next electromagnet. It will be appreciated that in such implementations, it is important to provide for periods of activation of each electromagnet that are exclusive of each other so that when the Hall effect sensors are read during such periods of activation, the magnetic fields of each electromagnet do not interfere substantially with one another.

In some implementations, the emitters have a non-collinear arrangement. That is, not all of the emitters are defined substantially along a single line. By way of example, with continued reference to FIG. 4A, in one embodiment, the emitters are arranged on the wrist portion 424 of the glove interface object 400 so as to be positioned in a configuration surrounding the wrist of the user. Such an arrangement is shown with reference to the cross-sectional view A, showing the emitters 422a, 422b, and 422c disposed in the wrist portion 424 in a non-collinear arrangement surrounding the wrist of the user when the glove interface object 400 is worn on the user's hand.

In some implementations, there are at least three emitters that are arranged in a non-collinear arrangement. By having at least three emitters in a non-collinear arrangement, then by determining distances from a given proximity sensor to each of the emitters, it is then possible to determine the specific location of the given proximity sensor relative to the emitters. The specific calculations which are required to determine the location of a given proximity sensor relative to the emitters will be apparent to those skilled in the art, and are therefore not discussed here in detail. However, broadly speaking, such a determination entails determining an intersection of line segments defined from each of the emitters, wherein each line segment has one endpoint defined at one of the emitters and another endpoint defined at the intersection. The line segments have lengths that are defined by the proximity/distance of the given proximity sensor from each of the emitters, as determined from data generated by the given proximity sensor. Described another way, the location of the given proximity sensor relative to the emitters is defined by the intersection of radii having origins defined by the locations of the emitters and magnitudes defined by the distances of each of the emitters to the given proximity sensor.

By way of example, with reference to FIG. 4A, the location of the index finger proximity sensor 404b that is located at the end of the index finger portion 402b of the glove interface object 400 can be defined in the following manner During the periods of activation of each of the emitters, the index finger proximity sensor 404b is read and the distance from the proximity sensor 404B to each of the emitters can be determined. A first radius can be defined having an origin located at the first emitter 422a and a magnitude defined by the distance from the index finger proximity sensor 404b to the first emitter 422a. A second radius can be defined having an origin located at the second emitter 422b and a magnitude defined by the distance from the index finger proximity sensor 404b to the second emitter 422b. A third radius can be defined having an origin located at the third emitter 422c and a magnitude defined by the distance from the index finger proximity sensor 404b to the third emitter 422c. Based on this information, the location of the index finger proximity sensor relative to the emitters can be defined as the intersection of the first, second, and third radii. It will be apparent to those skilled in the art that a similar procedure can be applied to determine the location of the other proximity sensors relative to the emitters.

As is shown in the illustrated embodiment, proximity sensors are provided at the fingertips of the glove interface object. In accordance with the principles discussed, each of these proximity sensors can be utilized to determine the location of the fingertips of the glove interface object relative to the emitters. It will be appreciated that in other implementations, additional proximity sensors may be located on or within the glove interface object, and that such may be utilized to determine the specific locations of particular parts of the glove interface object relative to the emitters. By way of example, a proximity sensor 406 is shown positioned on either a backhand portion or a palm portion of the glove interface object. The proximity sensor 406 can be utilized to determine the location of the backhand portion or the palm portion of the glove interface object, and thereby also indicate flexion and deviation of the user's hand as facilitated by bending movements of the user's wrist.

Figure 4B:
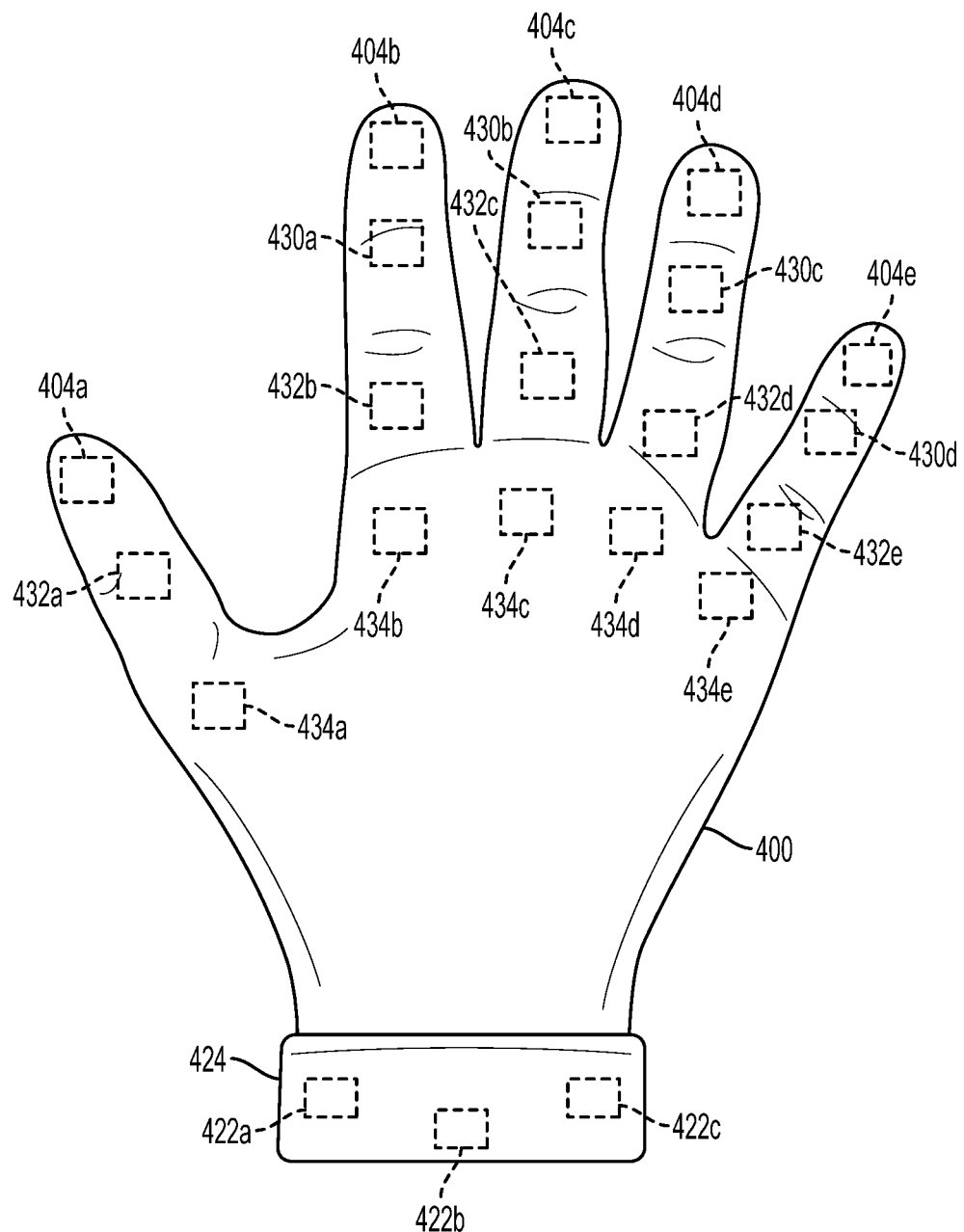
FIG. 4B illustrates a glove interface object having multiple proximity sensors defined thereon, in accordance with an embodiment of the invention.

FIG. 4B illustrates a glove interface object having multiple proximity sensors defined thereon, in accordance with an embodiment of the invention. In the illustrated embodiment, in addition to the proximity sensors 404a-e which are defined at fingertip portions of the glove interface object 400, there are proximity sensors positioned along the finger portions of the glove interface object to coincide with the joints of the fingers of the user's hand when wearing the glove interface object. These include proximity sensors 430a-d which are positioned to coincide with the distal interphalangeal joints, proximity sensors 432a-e which are positioned to coincide with the proximal interphalangeal joints, and proximity sensors 434a-e which are positioned to coincide with the metacarpophalangeal joints. By providing proximity sensors that coincide with the joints of the user's hand when wearing the glove interface object 400, then the pose of the user's hand can be determined with a high degree of precision.

Figure 5:
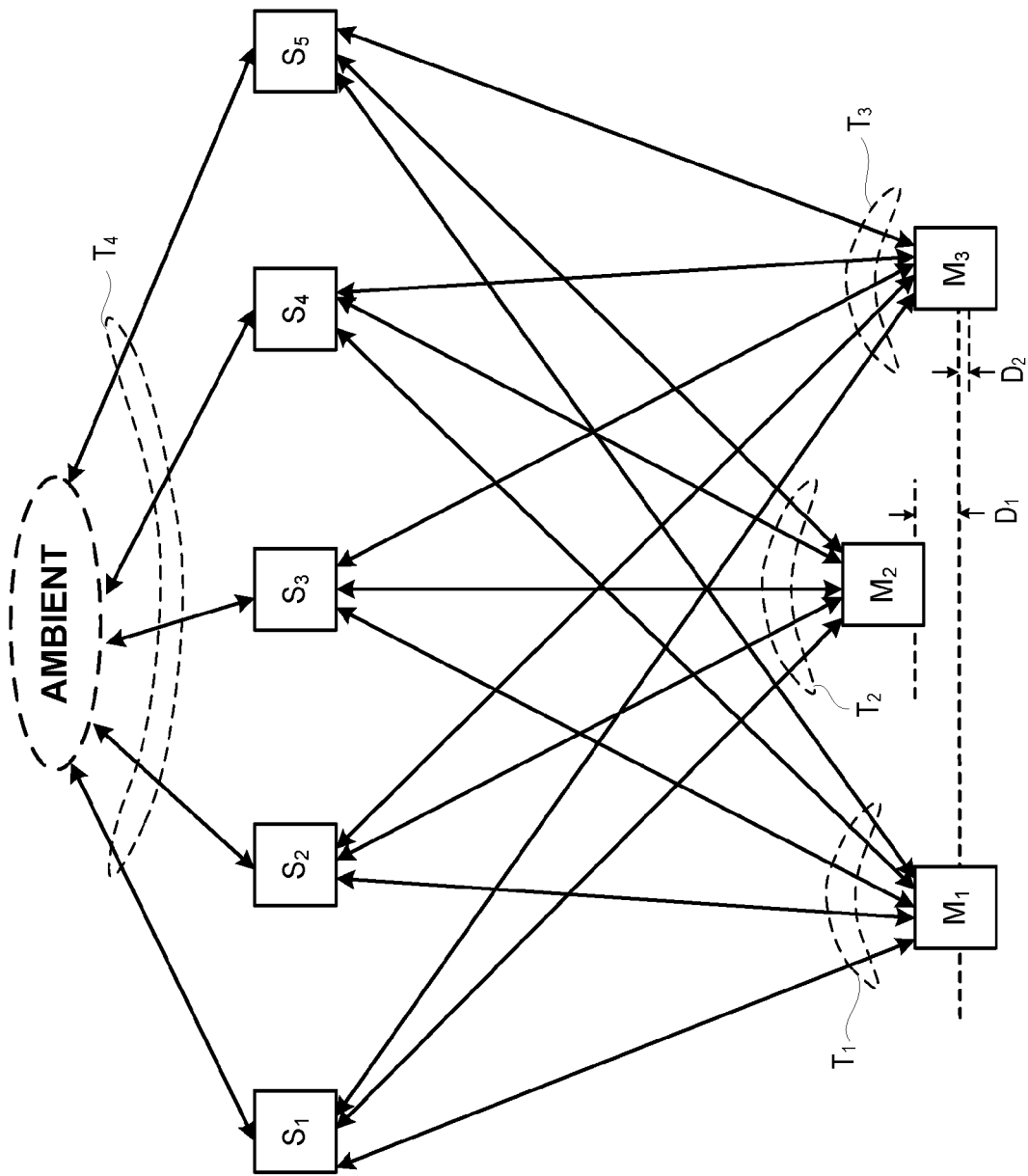
FIG. 5 is a diagram conceptually illustrating the operation of several emitters and sensors of a glove interface object in a time division multiplexed arrangement, in accordance with an embodiment of the invention.

FIG. 5 is a diagram conceptually illustrating the operation of several emitters and sensors of a glove interface object in a time division multiplexed arrangement, in accordance with an embodiment of the invention. For purposes of discussing the instant embodiment, the emitters consist of a plurality of electromagnets M1, M2, and M3. However, in other embodiments, other types of emitters may be utilized to achieve similar effects. Similarly, in the instant embodiment, a plurality of magnetic sensors S1, S2, S3, S4, and S5 are defined on finger portions (e.g. at the fingertips) of the glove interface object. In other embodiments, there may be any type of sensor capable of detecting emissions from the emitter.

During a first time period T1, electromagnet M1 is exclusively activated. That is, during the first time period T1, electromagnet M1 is in an activated state while electromagnets M2 and M3 are in a deactivated state. During this time period of activation T1, each of sensors S1, S2, S3, S4, and S5 is read. During a second time period T2, which succeeds the first time period T1, electromagnet M2 is exclusively activated, such that electromagnet M2 is in an activated state while electromagnets M1 and M3 are in a deactivated state. During the second time period T2, each of sensors S1, S2, S3, S4, and S5 are read. During a third time period T3, which succeeds the second time period T2, electromagnet M3 is exclusively activated, such that electromagnet M3 is in an activated state while electromagnets M1 and M2 are in a deactivated state. During the third time period T3, each of the sensors S1, S2, S3, S4, and S5 are read.

At the conclusion of one cycle of time periods T1, T2, and T3, each of the sensors will have been read once during the activation of each electromagnet (i.e. in the present example, each sensor is read three times, in respective correspondence to the three electromagnets). In some implementations, each sensor is configured to detect the strength of a magnetic field generated by the electromagnets. As the strength of a magnetic field varies with distance, then the detected strength of the magnetic field can indicate the distance of a given sensor to the electromagnet. Thus, for each sensor, the three readings taken per cycle indicate the distances of the sensor to each of the electromagnets. And as has been discussed, based on these distances, a relative location of the given sensor to the electromagnets can be determined. It will be appreciated that in the illustrated embodiment, three electromagnets and five sensors are shown; however, in other embodiments, there may be more than three electromagnets and more than five sensors.

Thus in accordance with the foregoing, the relative locations of each of the sensors to the electromagnets can be determined. In implementations wherein the sensors are positioned at the fingertips of the glove interface object, then the locations of the fingertips of the glove interface object can thus be determined. The successive activation of each of the electromagnets defines a cycle of activation of the electromagnets which can be repeated. It will be appreciated that during each cycle of activation of the electromagnets, the locations of the sensors (and by extension, the locations of the user's fingertips) are updated. In this manner, by generating a repeated cycle of activation of the electromagnets in combination with reading of the sensors during the periods of activation of the electromagnets, the locations of the sensors can be continually tracked.

It will be appreciated that as the locations of the sensors are continually tracked, then the real-time relative location of the user's fingers can be provided. In some implementations, a virtual hand in a virtual environment is controlled so as to have a pose that tracks that of the user's hand as determined from the tracking of the sensors on the glove interface object. This provides for a user to have real-time control of the pose of the virtual hand, as the movements of the user's hand/fingers will be substantially replicated by the virtual hand in real-time.

In some implementations, it can be desirable to determine and account for the presence of ambient magnetic fields that may be produced by other sources of magnetic fields in the local environment. Therefore, with continued reference to FIG. 5, in one embodiment during a time period T4, each of the sensors is read while each of the electromagnets is deactivated. The readings of the sensors taken while the electromagnets are deactivated indicate the strengths of magnetic fields which may be present in the local environment. Thus, these readings can be utilized to account for such ambient magnetic fields when determining the locations of the sensors relative to the electromagnets of the glove interface object, which is based on reading the sensors during the activation periods of the electromagnets. For example, for a given sensor, the ambient reading could be subtracted from a reading taken during activation of one of the electromagnets.

In some embodiments, the ambient sensor readings (i.e. readings of one or more of the sensors when the electromagnets are deactivated) are taken once for each cycle of activation of the electromagnets. However in other embodiments, the ambient sensor readings may be taken once every N number of cycles of activation of the electromagnets, wherein N is any natural number. By taking ambient sensor readings at a rate that is less than the rate of activation of each of the electromagnets, then less processing resources are consumed for the purpose of ambient readings than if ambient sensor readings are taken at the same rate; however, the fidelity of tracking the ambient readings is reduced.

In some implementations, the frequency of ambient readings can be positively correlated to an amount of movement of the glove interface object as a whole, such that ambient readings are taken with higher frequency when the glove interface object is determined to be moving at a higher rate, and ambient readings are taken with lower frequency when the glove interface object is determined to be moving at a lower rate. For example, in some implementations, ambient readings will cease to be taken when the glove interface object is determined to be in a stationary location for a predetermined amount of time. It will be appreciated that the location of the glove interface object can be determined based on data from motion sensors included in the glove interface object, from visual tracking of the glove interface object or a specific part thereon, or from any other method of tracking the location of the glove interface object.

In the foregoing implementations, it has generally been described that during each period of activation for each of the electromagnets, each of the sensors is read once. However, in other implementations, not every sensor is necessarily read during the period of activation of each of the electromagnets. In other words, though in some embodiments a given sensor is read during each cycle of activation of the electromagnets, in other embodiments, the given sensor may not be read during each cycle of activation of the electromagnets. That is, the given sensor may be read during every Nth cycle of activation, wherein N is any natural number. By selectively reading the sensors during particular cycles of activation of the electromagnets, particular sensors (and by extension, certain fingertips of the user) can be prioritized for tracking over others. For example, it may be the case that for a particular video game activity, movements of an index finger are more important than movements of the thumb. It may therefore be desirable to take readings of the index finger sensor with greater frequency (i.e. during more cycles of activation for a given unit of time) than the thumb sensor. In this manner, system resources can be prioritized to provide for greater fidelity tracking of the index finger over that of the thumb.

Extending the concept further, the specific rate of reading any of the sensors can be dynamically adjusted by the system in accordance with the context of the interactive application (e.g. video game) with which the glove interface object is being used. For example, an executing video game may set and dynamically adjust a parameter that defines the rate (per cycles of activation) at which a given sensor is read.

Depending upon the processing capabilities of the hardware of the system (e.g. the glove interface object and a computing device to which the glove interface object sends data), the readings of the sensors can be processed in sequential order (e.g. some or all of the sensors are read in predefined order during a given period of activation of an electromagnet) or in parallel (e.g. some or all of the sensors are read simultaneously during a given period of activation of an electromagnet). For example, in some implementations, the glove interface object may include a multi-channel sampling capability, so that some or all of its sensors can be read simultaneously. Subsequently, the processing of the readings may be performed in parallel and/or sequential manner to determine and track the locations of the sensors relative to the electromagnets.

It will be appreciated that the time-division multiplexing arrangement for activation of electromagnets and readings of the sensors (and associated processing to determine and track locations of parts of the glove interface object such as the fingertips) can be extended to the scenario where multiple glove interface objects are being utilized (e.g. left and right gloves for each hand of a single user, left and/or right gloves for each of multiple users). For example, the cycles of activation of the electromagnets for a left hand glove interface object (and its accompanying sensor readings) may alternate with the cycles of activation of the electromagnets for a right hand glove interface object (and its accompanying sensor readings).

In some embodiments, the cycles of activation of the electromagnets for each of multiple gloves (and the accompanying sensor readings) are themselves performed in a cyclical manner, so that a cycle of activation for a first glove interface object is followed by a cycle of activation for a second glove interface object, which is followed by a cycle of activation for a third glove interface object, etc., returning to the first glove interface object to repeat the overall sequence, and thereby facilitating tracking of the fingertips or other parts of the glove interface object.

Though in the present disclosure, embodiments are described with reference to electromagnets situated at or near a user's wrist, it should be appreciated that in other embodiments, such electromagnets may be located at other locations, such as on or near the user's palm, back of the palm, forearm, torso, or other body part, on the HMD, etc. The electromagnets may be arranged at any location that provides for the functionality described in accordance with the embodiments discussed herein.

Figure 6:
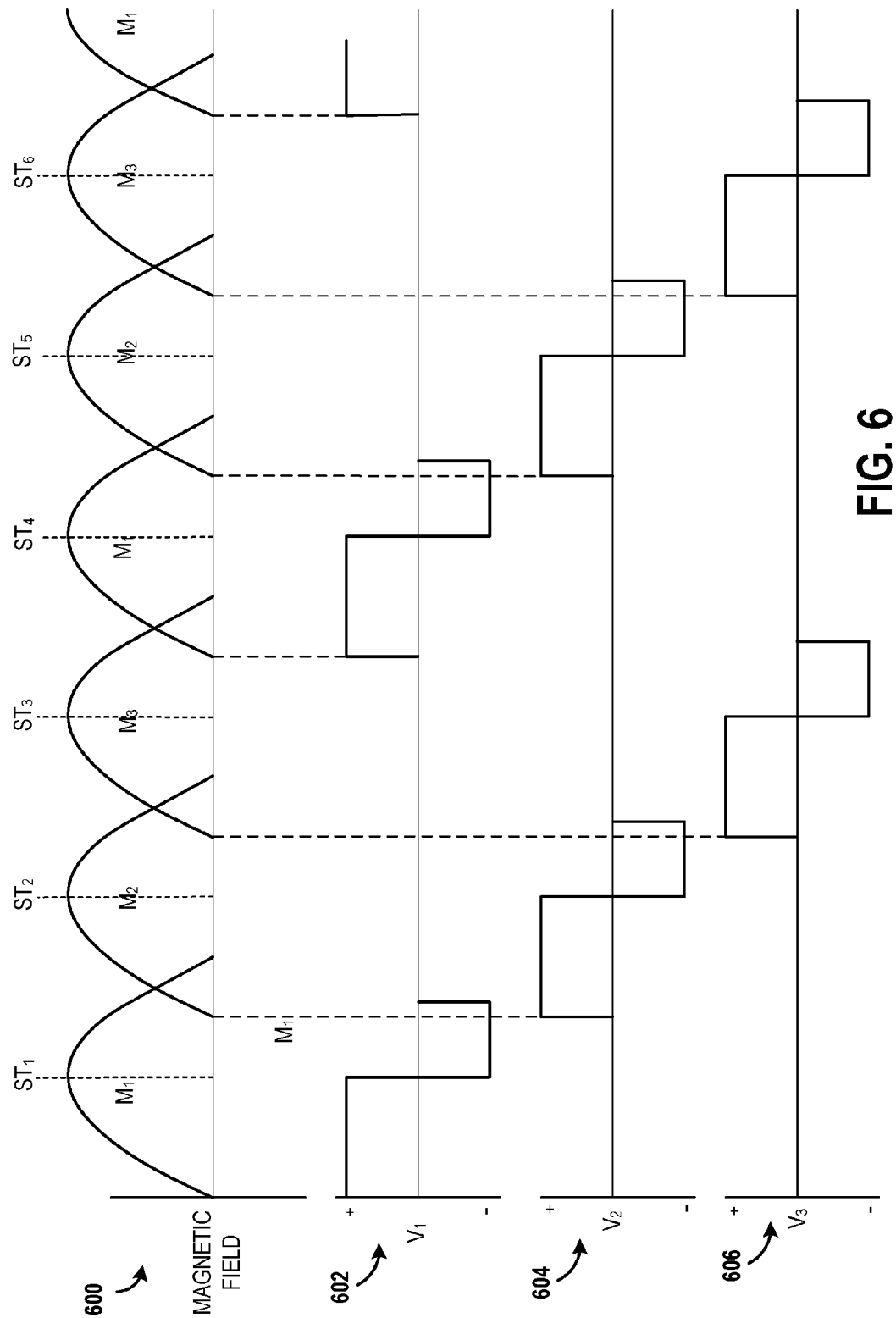
FIG. 6 illustrates several graphs showing the application of power to various electromagnets of a glove interface object, in accordance with an embodiment of the invention.

FIG. 6 illustrates several graphs showing the application of power to various electromagnets of a glove interface object, in accordance with an embodiment of the invention. Graph 600 illustrates the magnetic fields produced by each of several electromagnets M1, M2, and M3. As shown the magnetic fields for each of the electromagnets define periods during which each of the electromagnets is exclusively activated. However, an overlap exists during the deactivation of one electromagnet and the activation of a next electromagnet (e.g. when M1 is being deactivated and M2 is being activated). Also noted on the graph 600 are sampling times ST1, ST2, ST3, ST4, ST5, and ST6, which are the time points at which the sensors of the glove interface object are read. In the illustrated embodiment, the sensors are read at time points that correspond to the magnetic fields reaching substantially peak strengths. However, in other embodiments, the sensors may be read at time points corresponding to the magnetic fields reaching other relative strengths, provided the strengths of the magnetic fields when the sensors are read are consistent. That is, each time the sensors are read during the activation of the electromagnet M1, the strength of the electromagnet M1 is the same.

The graphs 602, 604, and 606 illustrate the voltage applied for each of the electromagnets M1, M2, and M3, respectively. As shown, in some implementations, a specific voltage (e.g. positive voltage) is applied to a given electromagnet (e.g. M1) that causes the magnetic field to increase. After a specified amount of time, the specific voltage may be reversed (e.g. negative voltage) so as to accelerate the reduction of the magnetic field and/or counteract any induced/temporary magnetization effects (or latent magnetic fields). Latent magnetic fields may result from inductance of the electromagnet coils, and as such, diodes may be used to more quickly effect changes in the magnetic field.

Figure 7:
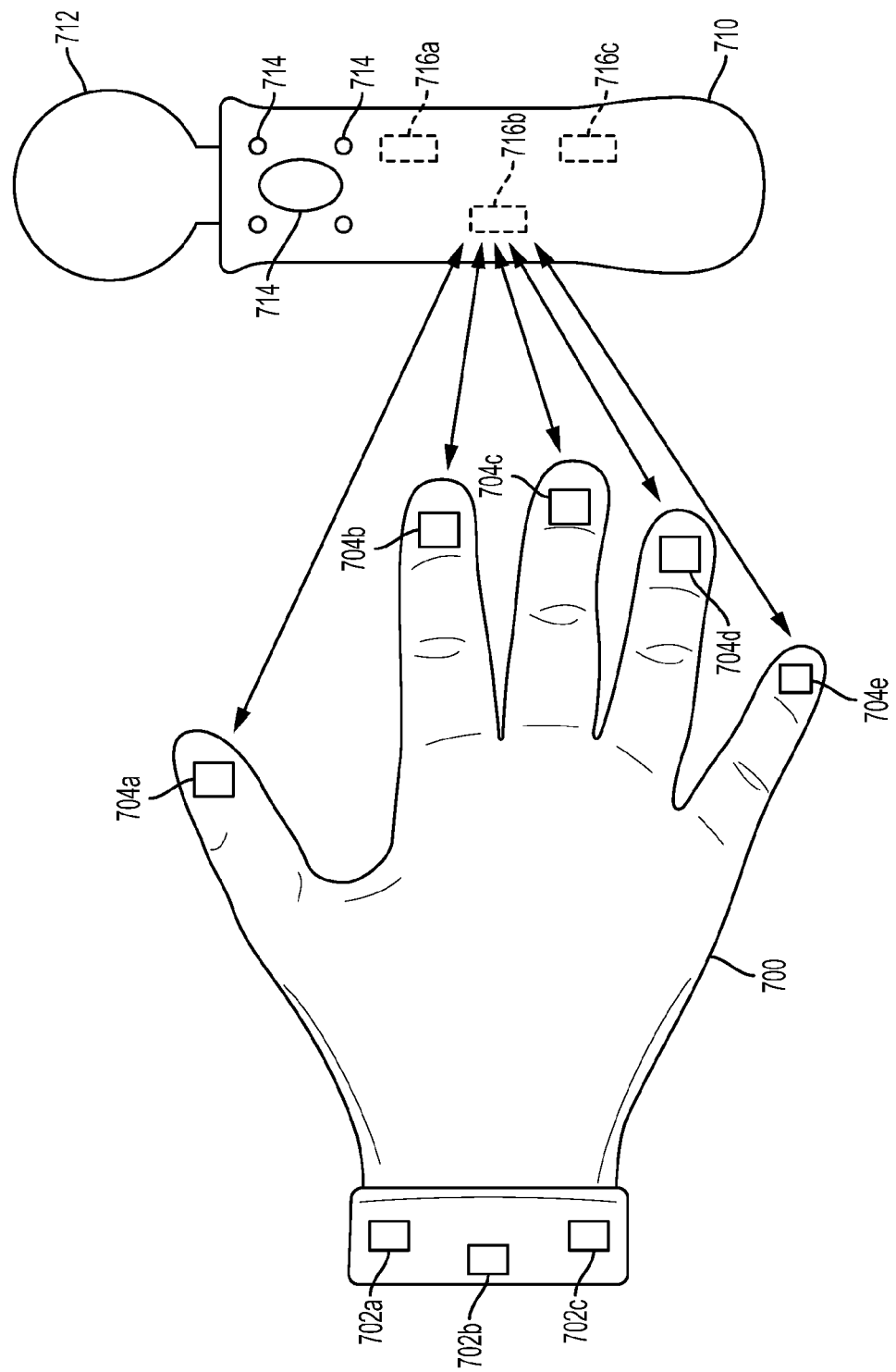
FIG. 7 illustrates a glove interface object configured for use with a peripheral device, in accordance with an embodiment of the invention.

FIG. 7 illustrates a glove interface object configured for use with a peripheral device, in accordance with an embodiment of the invention. In the illustrated embodiment, the glove interface object includes emitters 702a, 702b, and 702c, which are defined on a wrist portion of the glove interface object. A plurality of sensors 704a, 704b, 704c, 704d, and 704e are defined at fingertip portions of the glove interface object 700. Also shown is a peripheral device 710 that may be held or contacted by the glove interface object. In the illustrated embodiment, the peripheral device 710 is a motion controller including an illuminated object 712 that can be illuminated to facilitate tracking based on analysis of captured image data. Further, the peripheral device 710 may include various kinds of input devices such as buttons 714 for providing input, as well as various types of motion sensors, such as accelerometers, magnetometers, gyroscopes, etc. It will be appreciated that though a specific motion controller is shown, in other implementations, the peripheral device 710 may be any other type of interactive equipment utilized to provide input for an interactive application in accordance with the principles discussed herein. The peripheral device may communicate wirelessly with a computing device such as a gaming console.

The peripheral device may also include emitters 716a, 716b, and 716c, which can be sensed by the sensors on the glove interface object 700. The peripheral emitters 716a, 716b, and 716c can be operated in a similar or the same manner as that described with respect to emitters on the glove interface object. More specifically, the sensors can detect the strengths of signals emitted by the peripheral emitters, and generate data indicating proximity/distance of the sensors to the peripheral emitters. This information can be processed to identify the orientation/configuration of the user's hand relative to the peripheral device.

Furthermore, in various implementations, the operation of the glove emitters (702a, 702b, and 702c) and peripheral emitters (716a, 716b, and 716c), in combination with operation of the sensors (704a, 704b, 704c, 704d, and 704e) can have various configurations. Generally speaking, some or all of the sensors are read during the activation of a specific emitter on either the glove interface object or the peripheral device. Some possible configurations regarding the activation of the emitters are discussed below.

In some implementations, the glove emitters and the peripheral emitters are utilized in combination to allow tracking of the sensor locations relative to both of the glove emitters and the peripheral emitters. In some implementations, this may entail time-division multiplexing the activation sequences of the glove and peripheral emitters with each other. For example, activation of a glove emitter may alternate with activation of a peripheral emitter so that the activation sequences of the glove and peripheral emitters are interwoven with each other. In another embodiment, each of the glove emitters and peripheral emitters may alternate activation sequences.

In some implementations, the locations of the glove interface object and the peripheral object in space are tracked, and the activation of the emitters on both devices is determined and controlled based on their locations in space. For example, in one embodiment, when the glove interface object and the peripheral device are separated by greater than a predefined distance, then the glove emitters are utilized, while the peripheral emitters are deactivated and not utilized. However, when the separation between the glove interface object and the peripheral device reaches or becomes less than the predefined distance, then the glove emitters are deactivated and no longer utilized, while the peripheral emitters are activated and utilized. Thus, the sensors transition from sensing proximity to the glove emitters to sensing proximity to the peripheral emitters. It will be appreciated that transitioning from one set of emitters to the other may provide further advantages by reducing the number of emitters that are multiplexed (as compared to simultaneously using both sets of emitters) and reducing power consumption, e.g. of the glove interface object when the glove emitters are deactivated.

In another implementation, the utilization of the glove emitters versus the peripheral emitters may be controlled by an interactive application or video game for which the devices are providing input. For example, during one portion of a video game, the peripheral device is not utilized for input, and hence the peripheral emitters are deactivated while the glove emitters are activated and utilized. Whereas during another portion of the video game, the peripheral device is utilized for input, and hence the glove emitters will be deactivated while the peripheral emitters are activated and utilized.

When a user is using a head-mounted display (HMD), the user may not have the ability to see the local environment external to the HMD. However, by utilizing sensors on the glove interface object to detect emitters on the peripheral device, the location of the peripheral device relative to the glove interface object can be determined. Furthermore, the configuration of the user's hand and the peripheral device can be defined with precision to, for example, define the configuration of a corresponding virtual hand and virtual object that exist in a virtual space that is rendered on the HMD. For example, the peripheral device could define the positioning of the virtual object in the virtual space (e.g. a weapon such as a sword or gun), and the virtual hand could be shown holding the virtual object in a manner that is similar to the user's hold on the peripheral device. The movements of the user's fingers in relation to the peripheral device could be tracked and rendered as corresponding movements of the fingers of the virtual hand in relation to the virtual object.

Figure 8:
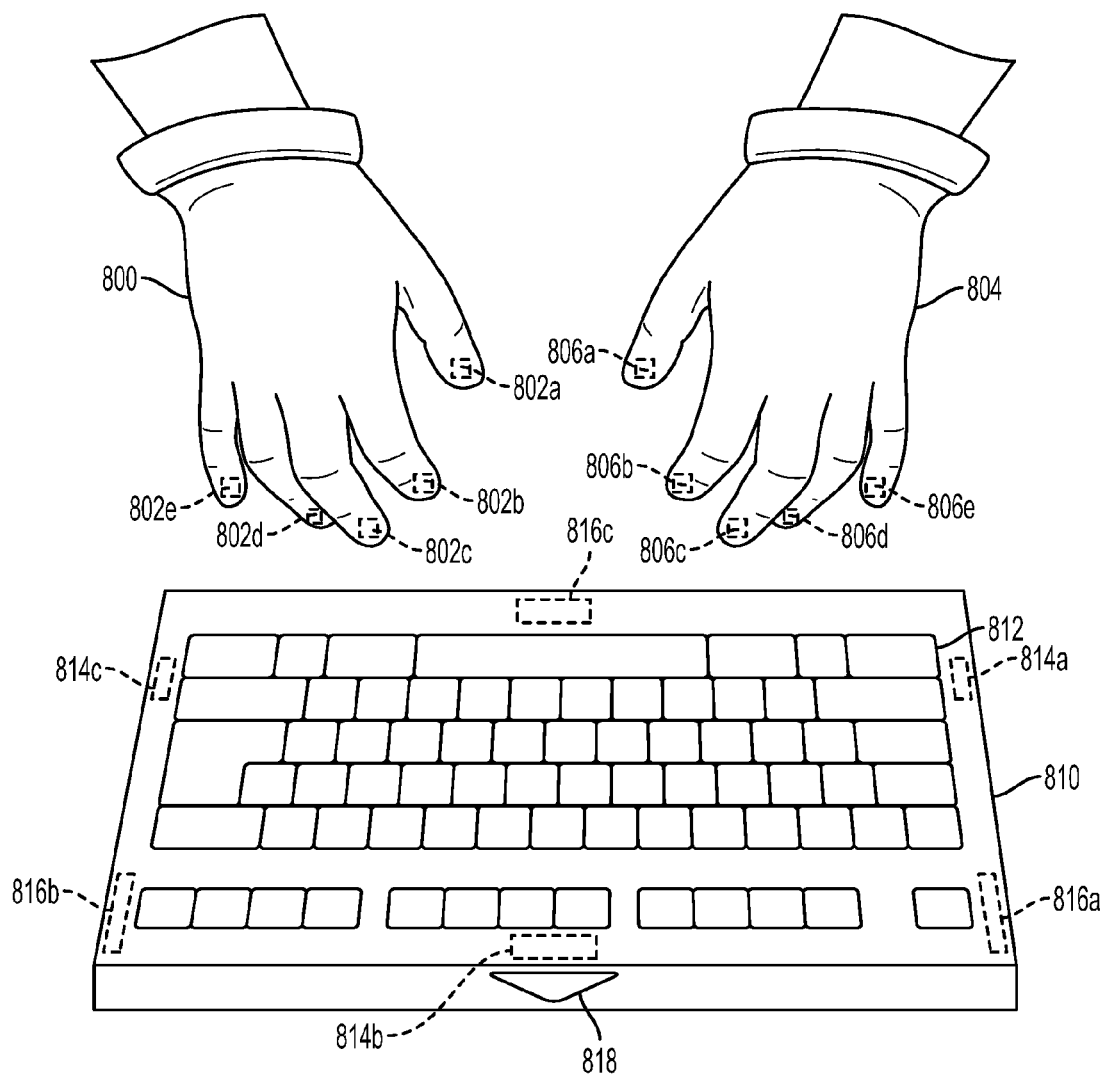
FIG. 8 illustrates a pair of glove interface objects configured to interact with a keyboard peripheral device, in accordance with an embodiment of the invention.

FIG. 8 illustrates a pair of glove interface objects configured to interact with a keyboard peripheral device, in accordance with an embodiment of the invention. A right hand glove interface object 800 is shown, including proximity sensors 802a-e; a left hand glove interface object 804 includes proximity sensors 806a-e. The proximity sensors 802a-e and 806a-e can be configured to detect emitters defined on their respective glove interface objects (e.g. defined on wrist portions of the glove interface objects).

A keyboard peripheral device 810 may include various keys 812 for providing input to an interactive application. The keyboard 810 may communicate wirelessly with a computing device that executes the interactive application. The keyboard 810 further includes emitters 814a-c, which can be detected by the proximity sensors 802a-e and 806a-e. In some implementations, the emitters 814a-c are electromagnets that produce magnetic fields, and the proximity sensors are magnetic sensors (e.g. Hall effect sensors) that detect the magnetic fields. The activation of the emitters and the reading of the proximity sensors can be configured in a time division multiplexed arrangement, as discussed previously. With such an arrangement, the locations of the proximity sensors relative to the emitters can be determined and tracked. And by extension, in implementations wherein the proximity sensors are positioned at the fingertip portions of the glove interface object, then the locations of the fingertips relative to the keyboard peripheral device can be determined and tracked.

The above-described configuration wherein proximity sensors on glove interface objects are utilized to detect emitters positioned on a peripheral device allows for very precise tracking of the user's hands in relation to a peripheral device. Thus, by way of example, virtual hands corresponding to the user's hands can be shown in a virtual space interacting with a virtual keyboard that corresponds to the keyboard peripheral device 810 with a high degree of fidelity. Though in the illustrated embodiment, a keyboard is specifically shown, it should be appreciated that in various other embodiments any kind of peripheral device can be configured to provide similar functionality as that described herein.

In another embodiment, the peripheral device 810 may not specifically include keys of a keyboard, but may define an interactive surface with which the user's hands may interact. The relative locations of the user's hands (including the fingertips) to the interactive surface of the peripheral device can be determined and tracked in accordance with the above-described methods. Furthermore, the peripheral device can define a virtual object in a virtual space, and virtual hands corresponding to the user's hands can be shown interacting with the virtual object in a manner that is defined by the interaction of the glove interface objects with the peripheral device. It will be appreciated that the virtual object can be defined to have any configuration and may include any sub objects without limitation. For example, the virtual object may impact define a virtual keyboard, and the virtual hands can be shown interacting with the virtual keyboard, as defined by the movements of the fingertips of the glove interface objects in relation to the peripheral device 810.

The virtual object can have a virtual surface corresponding to the interactive surface of the peripheral device, and interactions of the virtual hands with the virtual surface can be defined by the interactions of the glove interface objects with the interactive surface of the peripheral device. This type of arrangement can facilitate interaction with virtual objects by a user in an intuitive manner. For example, the virtual object may be a device having a touchscreen interface, and the user may thus interact with the virtual touchscreen by interacting with the interactive surface of the peripheral device. It should be appreciated that various kinds of interactions with the interactive surface of the peripheral device can be detected and recognized, including touches, taps, swipes, gestures, multi-finger touches/gestures, etc. As another example, the virtual object may include input devices, and the user may interact with the virtual input devices by interacting with the peripheral device.

In some implementations, the peripheral device 810 may additionally include long-range emitters 816*a-c*. The long-range emitters are configured to provide stronger signals than the emitters 814*a-c*, and are therefore detectable by the proximity sensors of the glove interface objects at a greater distance. In some implementations, the long-range emitters are utilized when the proximity sensors of the glove interface objects are located at a distance greater than a predefined threshold, whereas the emitters 814*a-c* are utilized when the proximity sensors of the glove interface objects are located at a distance at or less than the predefined threshold. When the glove interface objects are determined to have moved from being located beyond the threshold to within the threshold, then the system may transition from using the long-range emitters 816*a-c* to using the regular emitters 814*a-c*.

In some implementations, the peripheral device 810 may include an illuminated object 818, which can be illuminated for purposes of visual tracking. That is, the illuminated object can be recognized based on analysis of captured images of the interactive environment in which the peripheral device is located, and the location and/or orientation of the peripheral device can therefore be determined and tracked.

Figure 9:
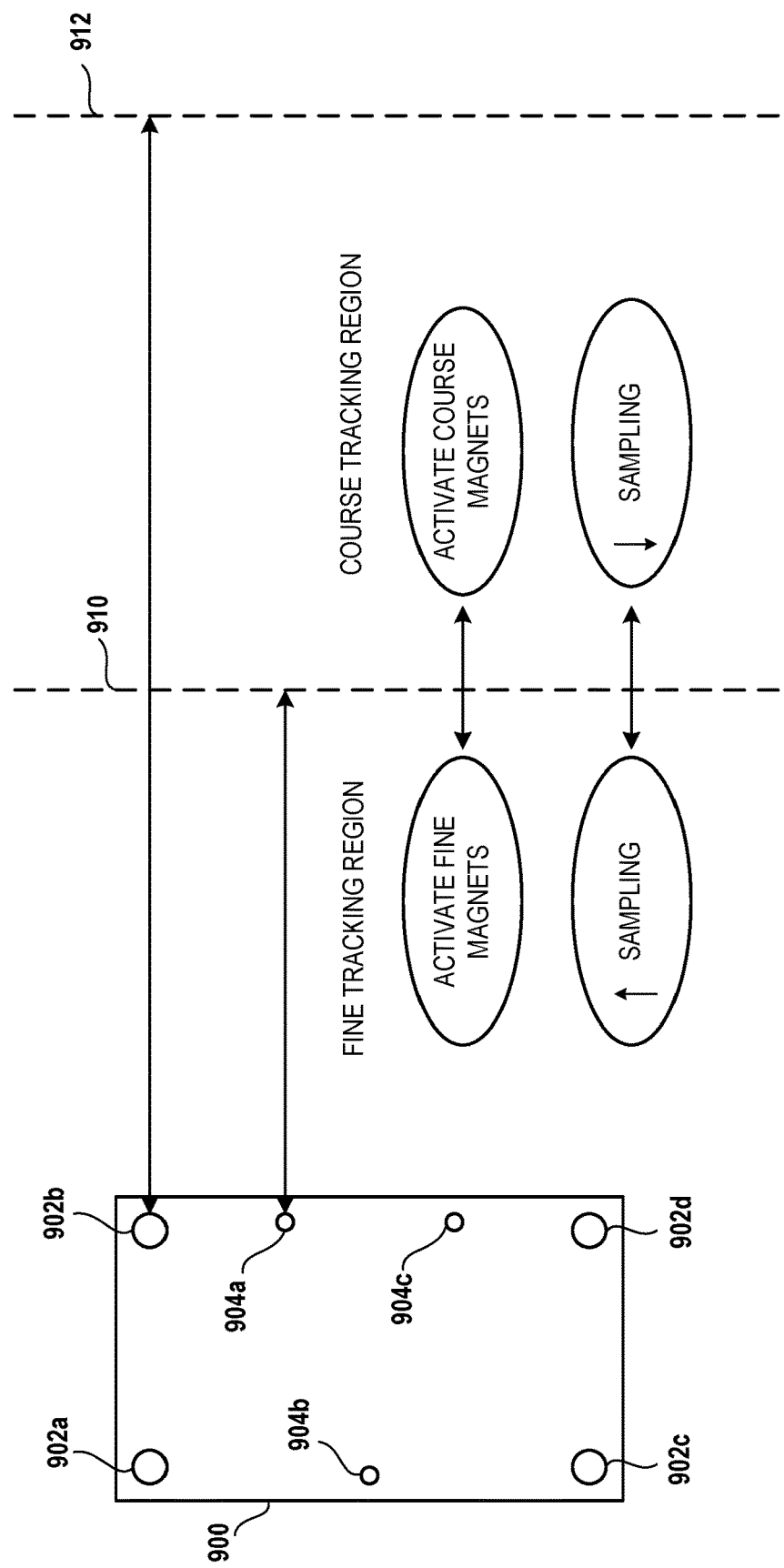
FIG. 9 illustrates a peripheral device having long-range and close range emitters configured to provide for course tracking and fine tracking of one or more glove interface objects having proximity sensors, in accordance with an embodiment of the invention.

FIG. 9 illustrates a peripheral device having long-range and close range emitters configured to provide for course tracking and fine tracking of one or more glove interface objects having proximity sensors, in accordance with an embodiment of the invention. In implementations discussed below, the emitters are defined as electromagnets and the proximity sensors are magnetic sensors such as Hall effect sensors; however, in other implementations, other types of emitters and corresponding proximity sensors can be utilized. As shown, the device 900 includes long-range electromagnets (emitters) 902*a-d* and close-range electromagnets (emitters) 904*a-c*. The long-range and close-range electromagnets can be activated to define magnetic fields that are sensed by magnetic sensors of a glove interface object, to provide for determination and tracking of the location and/or orientation of the glove interface object (e.g. the fingertips) relative to the device 900. The use of the electromagnets and magnetic sensors to determine the relative location of the glove interface object to the device 900 can be performed in accordance with the principles of operation previously described, including time-division multiplexed arrangements for controlling the electromagnets and reading the sensors.

In some implementations, the activation of the long-range and close-range electromagnets is dependent upon distance. For example, in one embodiment, when the location of the glove interface object (e.g. as defined by the location of magnetic sensors defined thereon) exceeds a predefined distance threshold 910 from the device 900, then the close-range electromagnets 904*a-c* are deactivated while the long-range electromagnets 902*a-d* are activated. Whereas when the location of the glove interface object is within the predefined distance threshold 910, then the close-range electromagnets are activated while the long-range electromagnets are deactivated. In some implementations, when the glove interface object reaches the threshold 910, then the system transitions from using either of the close/long range electromagnets to using the other set of electromagnets, the sensor readings/data transition from indicating proximity/distance to one set of electromagnets to indicating proximity/distance to the other set of electromagnets. In some implementations, the transition occurs after the glove interface object (and the proximity sensors) crosses over the threshold 910 for a predefined amount of time or predefined number of cycles of sensor sampling or electromagnet activation.

In some implementations, the tracking precision is adjusted depending upon distance of the proximity sensors (or the glove interface object) from the electromagnets. For example, in some implementations, the sample rate of the proximity sensors and the corresponding frequency of activation sequences of the electromagnets (e.g. electromagnets 904*a-c* and/or 902*a-d*) decreases as the distance of the proximity sensors from the electromagnets increases. In this manner, as the glove interface object approaches the device 900, then the tracking becomes more precise and fine-grained; and as the glove interface object moves away from the device 900, then the tracking becomes more course, and utilizes less bandwidth and processing resources.

It will be appreciated that the above-described variation in tracking precision according to distance from the electromagnets (or the device 900) can be applied in combination with the long-range and close-range electromagnets. For example, in one embodiment, when the glove interface object is within the threshold distance 910 from the device 900, and the close-range electromagnets are actively utilized, then the sampling rate of the proximity sensors and the corresponding frequency of the activation sequences of the close-range electromagnets are set at a first level. Whereas when the glove interface object exceeds the threshold distance 910 from the device 900, and the long-range electromagnets are actively utilized, then the sampling rate of the proximity sensors and the corresponding frequency of the activation sequences of the close-range electromagnets are set at a second level that is less than the first level. In this manner, then the region that is at or within the threshold distance 910 defines a fine tracking region, and the region that is beyond the threshold distance 910 defines a course tracking region.

In some implementations, another distance threshold 912 is defined beyond which no electromagnets of the device 900 are activated. Therefore, in such implementations, the course tracking region is bounded by the distance threshold 910 and the distance threshold 912. When the glove interface object exceeds the distance threshold 912, then the proximity sensors of the glove interface object are not utilized to indicate proximity to the device 900.

In the above-described implementations, reference has been made to the proximity or distance of the glove interface object and its proximity sensors to the device 900 and its electromagnets. It is contemplated that the determination of the locations of the glove interface object and the device 900 relative to each other can be performed based on the magnetic tracking methods thus described and/or by other methods, such as by visual tracking (e.g. capturing images of the interactive environment and employing image recognition to recognize and track the glove interface object and/or the device 900) and the use of motion sensors (e.g. accelerometers, gyroscopes, magnetometers) included in the glove interface object and/or the device 900.

In one embodiment illustrating several of the present concepts applied in combination, when the glove interface object exceeds the threshold 912, then magnetic tracking of the glove interface object relative to the device 900 is not performed. However, magnetic tracking of the fingertips of the glove interface object relative to itself (e.g. using electromagnets on a wrist portion of the glove interface object) may be performed. The location of the glove interface object in space is determined by visual tracking and/or use of motion sensors in the glove interface object; and the location of the device 900 in space can also be determined by visual tracking and/or use of motion sensors in the device 900. When the glove interface object crosses over the threshold 912 and moves into the course tracking region (as determined from the visual tracking and/or motion sensor tracking), then the long-range electromagnets 902*a-d* of the device 900 are activated and the proximity sensors of the glove interface object are utilized, at least in part, to detect proximity and/or relative location to the long-range electromagnets. During this time, the activation sequence of the long-range electromagnets could be multiplexed with the activation sequence of wrist electromagnets of the glove interface object, so that proximity sensors could indicate proximity/relative location to both sets of electromagnets during different sampling cycles. When the glove interface object crosses over the threshold 910 into the fine tracking region, then the close-range electromagnets 904*a-c* are activated at a higher activation sequence frequency than that of the long-range electromagnets. The wrist electromagnets of the glove interface object may be completely deactivated at this point, so that the proximity sensors indicate proximity to the close-range electromagnets exclusively.

The specific examples of configurations for utilizing magnetic tracking, including course and fine tracking, in combination with other types of tracking such as visual and motion sensor based tracking, have been described by way of example only and not by way of limitation. For purposes of brevity, not all possible combinations of these methods of tracking are described in detail. However, it will be apparent to those skilled in the art, that any of the principles and methods discussed herein can be applied in combination with each other to define other embodiments which are contemplated as part of the present disclosure.

In some implementations, visual tracking is utilized to determine the location and/or orientation of a glove interface object in the local environment, whereas the magnetic tracking schema described herein is utilized to obtain the fine positioning of the user's hand(s) including the positioning of the user's fingers. This information can be utilized as input for an interactive application.

In another implementation, instead of having two separately defined long-range and close-range electromagnets, a single set of electromagnets may be utilized in a high-power configuration (for long-range tracking) and a low-power configuration (for close-range tracking) to achieve similar effects. When the high-power configuration is utilized, the frequency of activation sequences may be reduced as compared to the low-power configuration, thereby conserving battery power.

In various implementations, the number of long-range and close-range electromagnets may vary. In different implementations, there may be more or fewer short-range electromagnets than long-range electromagnets. In implementations wherein the same set of electromagnets are utilized for long-range and close-range tracking, the number of electromagnets which are activated and utilized may vary in a similar manner.

In some implementations, fine-grained tracking is utilized for rendering (e.g. a corresponding virtual hand), whereas coarse tracking is utilized for gesture recognition. In some applications or during certain times of interactivity (e.g. virtual hand is not in current view frustum), there may be no rendering of the corresponding virtual hand, and in such circumstances, coarse tracking is sufficient for purposes of gesture recognition. Whereas when the virtual hand is being actively rendered, fine tracking can be engaged to provide for high fidelity and responsiveness of the rendering.

Additionally, it will be appreciated that though long-range and close-range tracking have been described with respect to a peripheral device, there may be any number of defined ranges, and/or the sampling rate of the proximity sensors and the frequency of activation sequences of the electromagnets may be continuously variable according to distance, velocity of movement of the fingers, battery life, as set by an interactive application such as a video game, etc. Furthermore, similar principles may be applied with the glove interface object alone, the sampling rate of the proximity sensors and the frequency of activation of the electromagnets of the glove interface object being variable according to location of the glove (e.g. in predefined ranges/regions/locations), orientation of the glove, as set by the interactive application, etc. For example, when a user's hands are in a downward pointing resting position, then the sampling rate and frequency of activation may be reduced, whereas when the user's hands are raised for interactivity, then the sampling rate and frequency of activation may be increased.

As has been discussed, when a user is wearing an HMD, their view of the local environment may be obstructed, and this makes it difficult to locate and interact with physical devices in the local environment. However, by utilizing a system of emitters on a peripheral device and corresponding proximity sensors on a glove interface object, the proximity and relative location of the user's hand to the peripheral device can be determined. Such information can be utilized to assist a user in finding the peripheral device when they are unable to see it. For example, an indicator could be displayed in the user's view (e.g. of a virtual environment) that is being rendered on the HMD, wherein the indicator is configured to indicate the location of the peripheral device in the local environment. A virtual hand that corresponds to the user's hand could also be shown, such that the positional relationship between the indicator and the virtual hand is accurately representative of the relationship between the peripheral device and the user's hand. As such, the user is able to guide their hand to the peripheral device on the basis of the displayed scene on the HMD.

In addition to assisting the user in finding a peripheral device when wearing an HMD, the magnetic tracking methods described herein can be utilized to allow a user to see the positioning of their hands and fingers relative to the peripheral device in the view (e.g. of a virtual space) that is being presented on the HMD. For example, the virtual hand can be shown interacting with a representation of the peripheral device, wherein the movements of the virtual hand correspond to those of the user's hand as detected via the glove interface object. In this manner, the user is able to interact with the peripheral device in an intuitive manner despite not having a direct line of sight, as they are able to see a corresponding interaction in the virtual space rendered on the HMD.

Additionally, embodiments have been described with reference to a head-mounted display. However, it should be appreciated that in other embodiments, non-head mounted displays may be substituted, such as a television, projector, LCD display screen, portable device screen (e.g. tablet, smartphone, laptop, etc.) or any other type of display that can be configured to render video in accordance with the present embodiments of the invention.

Figure 10A:
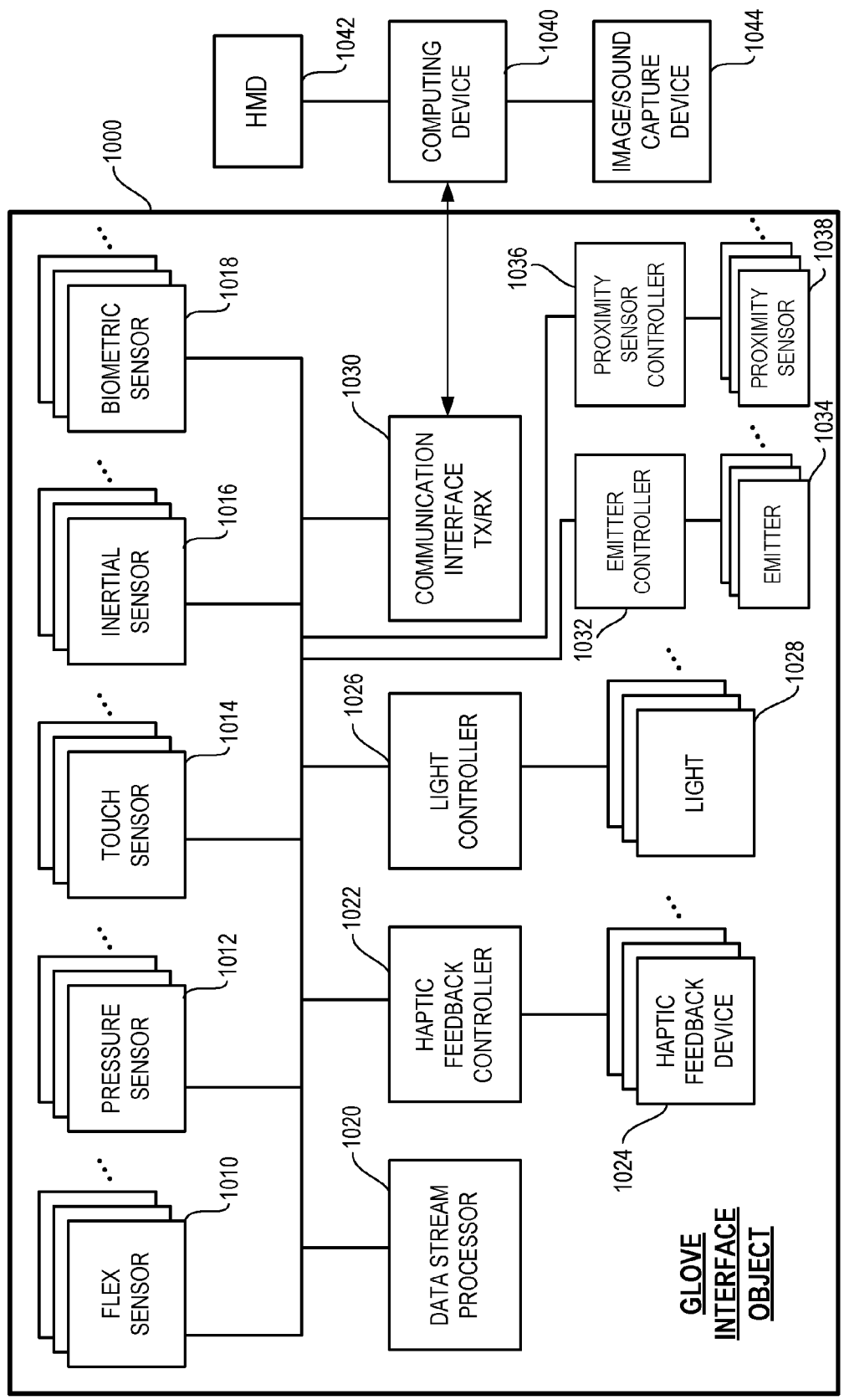
FIGS. 10A and 10B schematically illustrate a system for interfacing with an interactive application using a glove interface object, in accordance with an embodiment of the invention.

FIG. 10A schematically illustrates a system for interfacing with an interactive application using a glove interface object, in accordance with an embodiment of the invention. The glove interface object 1000 includes flex sensors 1010, pressure sensors 1012, touch switches 1014, inertial sensors 1016, and biometric sensors 1018. A data stream processor 1020 is configured to process data from the various sensors. It will be appreciated that in various embodiments, the data stream processor 1020 may process sensor data to various extents, including determining values quantifying sensed activity, identifying poses, gestures, movements, etc. A haptic feedback controller 1022 is configured to control the operation of haptic feedback devices 1024. A light controller 1026 is configured to control the operation of lights 1028. A communications interface is configured to communicate data to/from other devices.

The glove interface object further includes an emitter controller 1032 that controls the operation of emitters 1034, including the activation and deactivation thereof. Proximity sensor controller 1036 controls the operation of proximity sensors 1038, including activating (e.g. supplying current to the proximity sensors) and reading the proximity sensors. The emitter controller 1032 and proximity sensor controller 1036 can be configured to provide for time-division multiplexing of the activation/deactivation of the emitters and the reading of the proximity sensors.

A computing device 1040 is configured to execute a video game, and communicate with the glove interface object 1000. The video game is rendered on an display/HMD 1042. An image/sound capture device 1044 captures images and sound from the interactive environment in which the user is situated. It should be appreciated that the computing device 1040 receives data from the glove interface object such as sensor data, and the computing device may also generate commands to control the operation of the various devices of the glove interface object 1000, to effect the functionality of the glove interface object discussed herein.

Figure 10B:
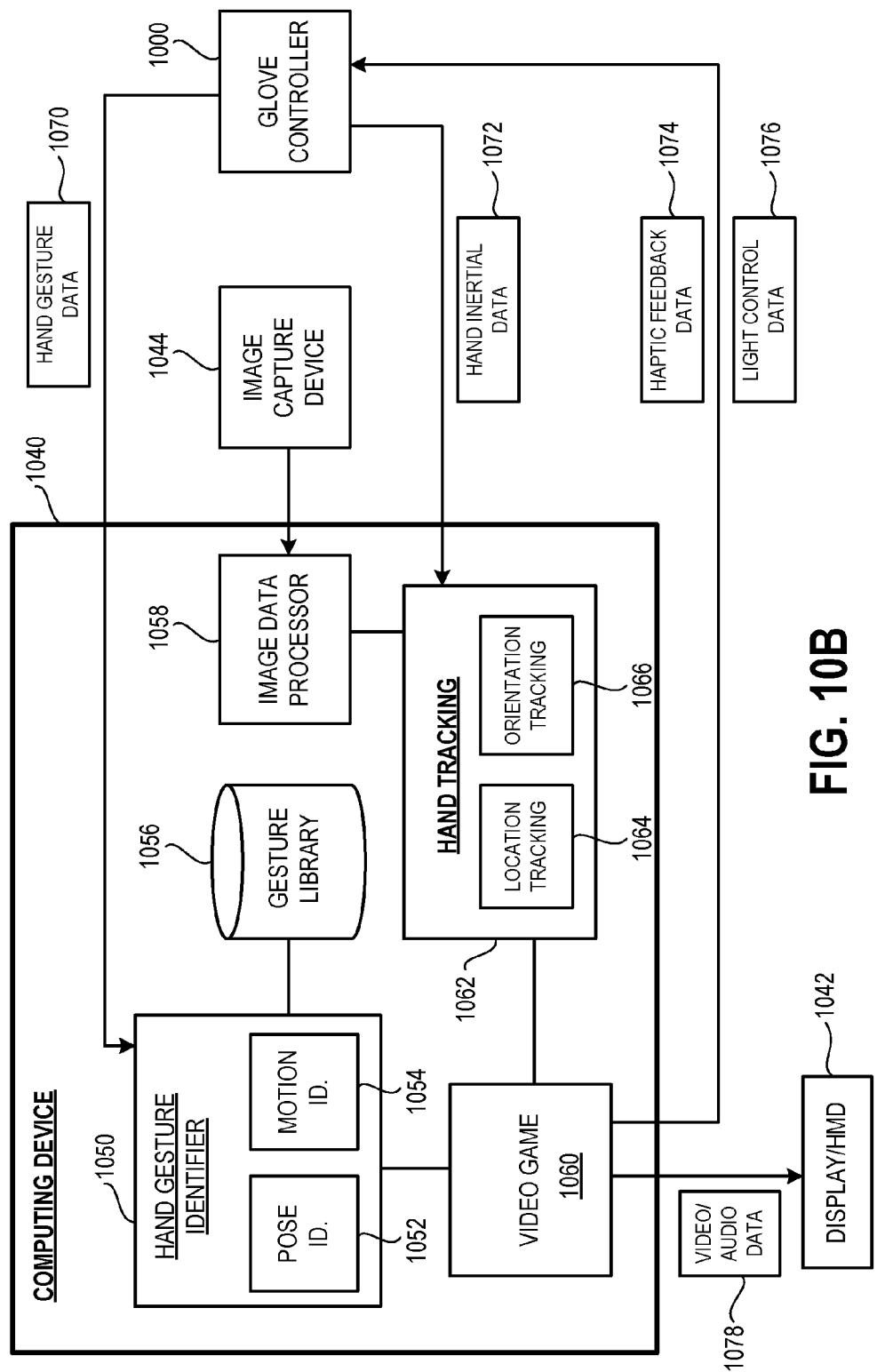

FIG. 10B illustrates additional components of the computing device 1040, in accordance with an embodiment of the invention. The glove interface object 1000 provides hand gesture data, detected/processed from the glove interface object's various sensors, to a hand gesture identifier 1050. The hand gesture identifier 1050 can define a hand pose identifier 1052 for identifying a pose of the user's hand, and a hand motion identifier 1054 for identifying dynamic movements of the user's hand, such as motion and/or changes in the pose of the user's hand. These define gestures detected from the glove interface object 1000 that are supplied to a video game 1060 as input. In one embodiment, a gesture library 1056 is provided, containing reference data defining various gestures, which may be utilized to identify gestures for the video game.

In accordance with embodiments described herein, data indicating distances from various sensors to various emitters can be generated and processed to determine the relative locations of the sensors to the emitters. This information can be utilized to identify and/or infer the pose of the user's hand. For example, by identifying the location of the fingertips (at which the sensors are disposed) relative to the user's wrist (at which the emitters are disposed), then the user's hand pose can be determined by an inverse kinematic process, including determination of various aspects such as the pose of the user's fingers (including flexion and deviation of the user's fingers, e.g. bend of specific joints (e.g. knuckles)) and the pose of the user's wrist (including flexion and deviation of the user's wrist). It will be appreciated that in some embodiments, sensor data can be correlated to hand pose, such by use of a look-up table. In some implementations, a model of the user's hand is generated by the computing device and input from the glove interface object is utilized to update the model.

Additionally, the game system may control sampling frequencies and emissions from the glove interface object based on the in-game context.

An image data processor 1058 processes images captured by the image capture device 1044, to identify trackable objects such as lights on the glove interface object 1000. The hand tracking processor 1062 is configured to perform location tracking 1064 and orientation tracking 1066 of the hand of the user, based on the identified trackable objects as well as inertial data 1072 from the glove interface object 1000. The location and orientation of the glove interface object (as defined by the user's hand) may also be provided as input to the video game 1060. The video game 1060 may generate haptic feedback data 1074 for transmission to the glove interface object 1000, which thereby produces the haptic feedback. The video game 1076 may also generate light control data 1076 for controlling the lights on the glove interface object 1000. Additionally, the video game 1060 generates video/audio data 1078 for rendering by the display/HMD 1042.

In some embodiments, the glove interface object is defined by an inner glove and an outer glove. The inner glove is removable and washable, whereas the outer glove contains the hardware for the glove interface object's functionality as described herein. Additionally, the inner glove may function as an insulator to insulate the hardware of the glove interface object from the user.

In some embodiments, haptic feedback can be provided by vibrating the fingertips at various frequencies to simulate textures as a user moves his fingers along a surface.

In some embodiments, force feedback mechanisms can be included in the glove interface object. Devices can be included which oppose motions of the user's hands/fingers, to simulate resistance encountered when making such motions. For example, a force feedback mechanism may oppose the motion of closing one's fingers, thus simulating the feel for grabbing/holding an object.

In some embodiments, pressure feedback mechanisms can be provided which apply pressure to at least a portion of the hand as a feedback mechanism. For example, a clamp may squeeze a finger as feedback, e.g. when touching a virtual object.

It should be appreciated that the input provided by the glove interface object can be applied to provide real-time control of a virtual hand or other object in a virtual environment. In some embodiments, the input provided by the glove interface object provides control of a non-hand-like object in the virtual environment, such as enabling manipulation of the object. In some embodiments, the input provided by the glove interface object provides real-time control of an arm or hand-like object of a character that is controlled by the user. When utilized in the context of presentation on an HMD device, the glove interface object can provide a highly immersive and intuitive experience with respect to control of an arm/hand or similar appendage of a character in the virtual environment. That is, the user can experience a sensation as if the virtual arm/hand or appendage really is their own arm/hand, resulting from the real-time control and responsiveness afforded by the glove interface object in combination with the highly immersive presentation of the HMD device.

Furthermore, it will be appreciated that within an interactive session of an interactive application, the virtual hand may be shown or not shown depending upon the execution state of the interactive application. For example, in a video game, there may be various stages/scenes/tasks/levels/etc. that may or may not require the virtual hand to be shown. Furthermore, the rendering of the virtual hand may be shown or not shown in the virtual environment depending upon the context or content of the virtual environment. For example, the virtual hand might be shown (or made available to be shown) when a specific object is present in the virtual scene, or when the user approaches the specific object to manipulate it or otherwise interact with it.

In some implementations, the pose and/or movement of the user's hand/fingers can define a gesture that can be identified from tracking the glove interface object in accordance with the principles discussed herein. The identified gesture can be configured to cause some action in the virtual environment—that is, the gesture is recognized and correlated to a produce a specific input for the interactive application that is generating the virtual environment. In various embodiments, a virtual hand may or may not be shown in conjunction with the gesture identification.

Figure 11:
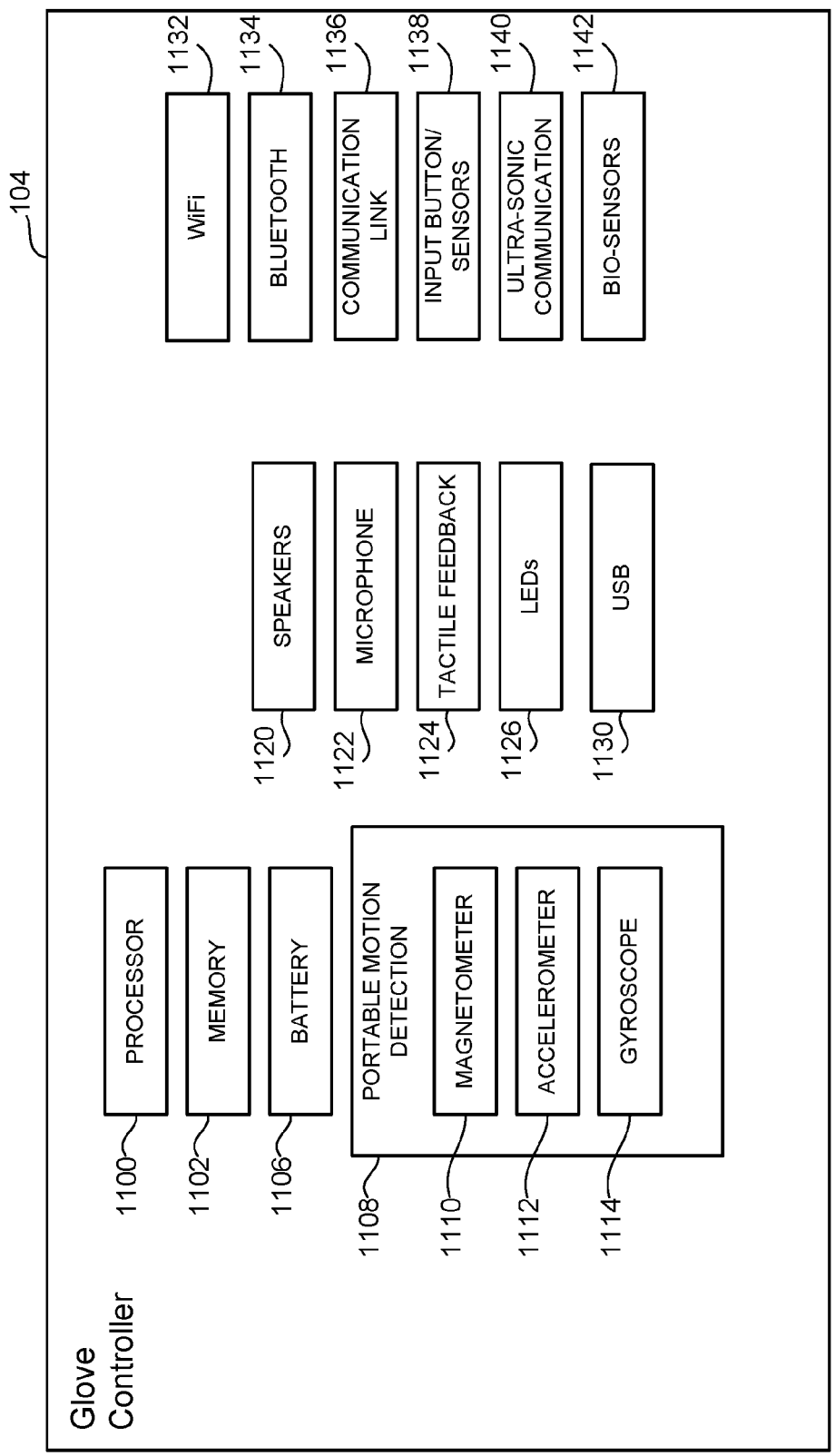
FIG. 11 illustrates components of a glove interface object, in accordance with an embodiment of the invention.

With reference to FIG. 11, a diagram illustrating components of a glove interface object 104 is shown, in accordance with an embodiment of the invention. The glove interface object 104 includes a processor 1100 for executing program instructions. A memory 1102 is provided for storage purposes, and may include both volatile and non-volatile memory. A battery 1106 is provided as a power source for the glove interface object 104. A motion detection module 1108 may include any of various kinds of motion sensitive hardware, such as a magnetometer 1110, an accelerometer 1112, and a gyroscope 1114.

The glove interface object 104 includes speakers 1120 for providing audio output. Also, a microphone 1122 may be included for capturing audio from the real environment, including sounds from the ambient environment, speech made by the user, etc. The glove interface object 104 includes tactile feedback module 1124 for providing tactile feedback to the user. In one embodiment, the tactile feedback module 1124 is capable of causing movement and/or vibration of the glove interface object 104 so as to provide tactile feedback to the user.

LEDs 1126 are provided as visual indicators of statuses of the glove interface object 104. For example, an LED may indicate battery level, power on, etc. A USB interface 1130 is included as one example of an interface for enabling connection of peripheral devices, or connection to other devices, such as other portable devices, computers, etc. In various embodiments of the glove interface object 104, any of various kinds of interfaces may be included to enable greater connectivity of the glove interface object 104.

A WiFi module 1132 is included for enabling connection to the Internet or a local area network via wireless networking technologies. Also, the glove interface object 104 includes a Bluetooth module 1134 for enabling wireless connection to other devices. A communications link 1136 may also be included for connection to other devices. In one embodiment, the communications link 1136 utilizes infrared transmission for wireless communication. In other embodiments, the communications link 1136 may utilize any of various wireless or wired transmission protocols for communication with other devices.

Input buttons/sensors 1138 are included to provide an input interface for the user. Any of various kinds of input interfaces may be included, such as buttons, touchpad, joystick, trackball, etc. An ultra-sonic communication module 1140 may be included in glove interface object 104 for facilitating communication with other devices via ultra-sonic technologies.

Bio-sensors 1142 are included to enable detection of physiological data from a user. In one embodiment, the bio-sensors 1142 include one or more dry electrodes for detecting bio-electric signals of the user through the user's skin.

The foregoing components of glove interface object 104 have been described as merely exemplary components that may be included in glove interface object 104. In various embodiments of the invention, the glove interface object 104 may or may not include some of the various aforementioned components. Embodiments of the glove interface object 104 may additionally include other components not presently described, but known in the art, for purposes of facilitating aspects of the present invention as herein described.

It will be appreciated by those skilled in the art that in various embodiments of the invention, the aforementioned glove interface object may be utilized in conjunction with an interactive application displayed on a display to provide various interactive functions. The exemplary embodiments described herein are provided by way of example only, and not by way of limitation.

Figure 12:
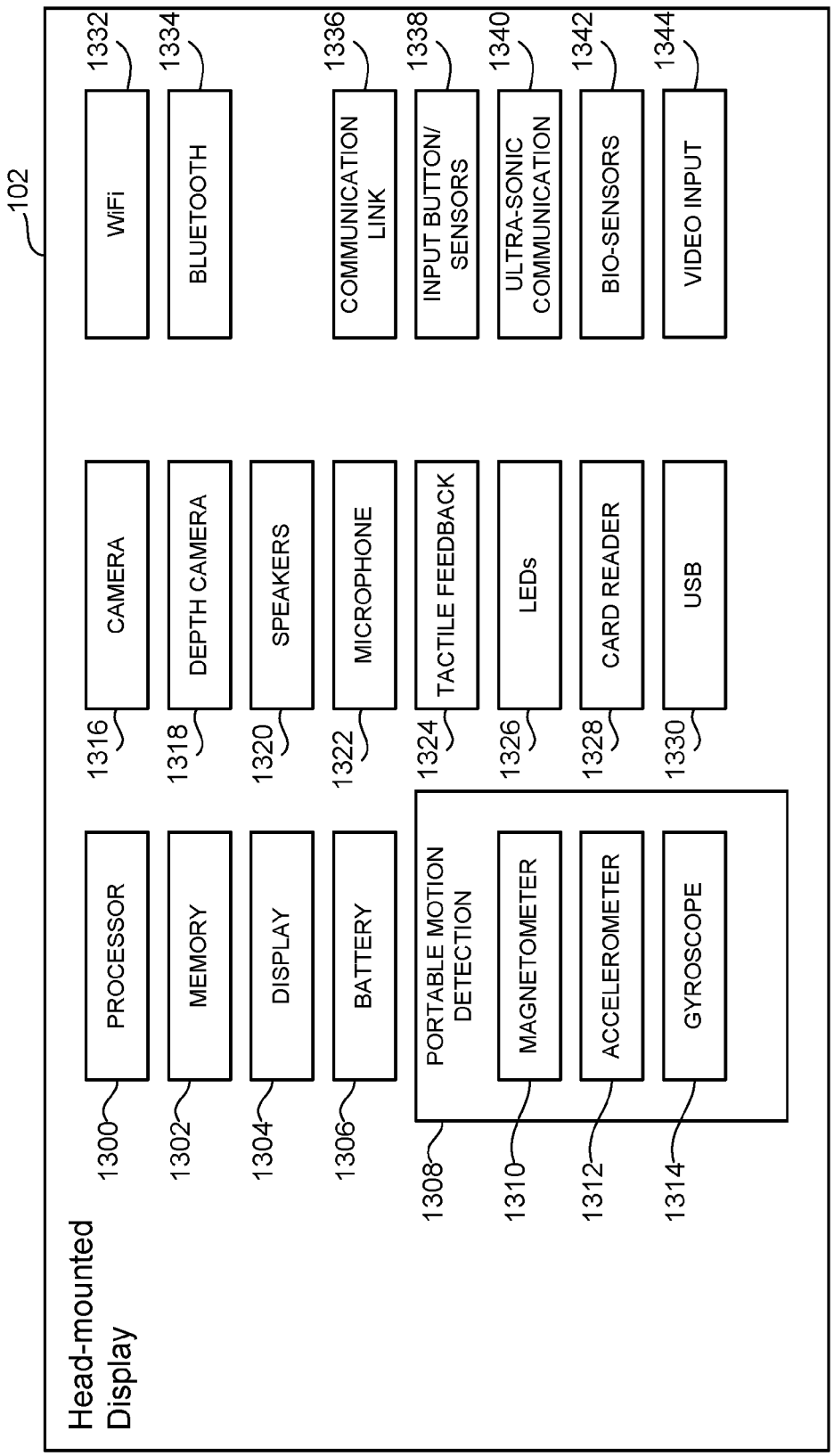
FIG. 12 illustrates components of a head-mounted display, in accordance with an embodiment of the invention.

With reference to FIG. 12, a diagram illustrating components of a head-mounted display 102 is shown, in accordance with an embodiment of the invention. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet or a local area network via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultrasonic technologies.

Bio-sensors 1342 are included to enable detection of physiological data from a user. In one embodiment, the bio-sensors 1342 include one or more dry electrodes for detecting bio-electric signals of the user through the user's skin.

A video input 1344 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

Figure 13:
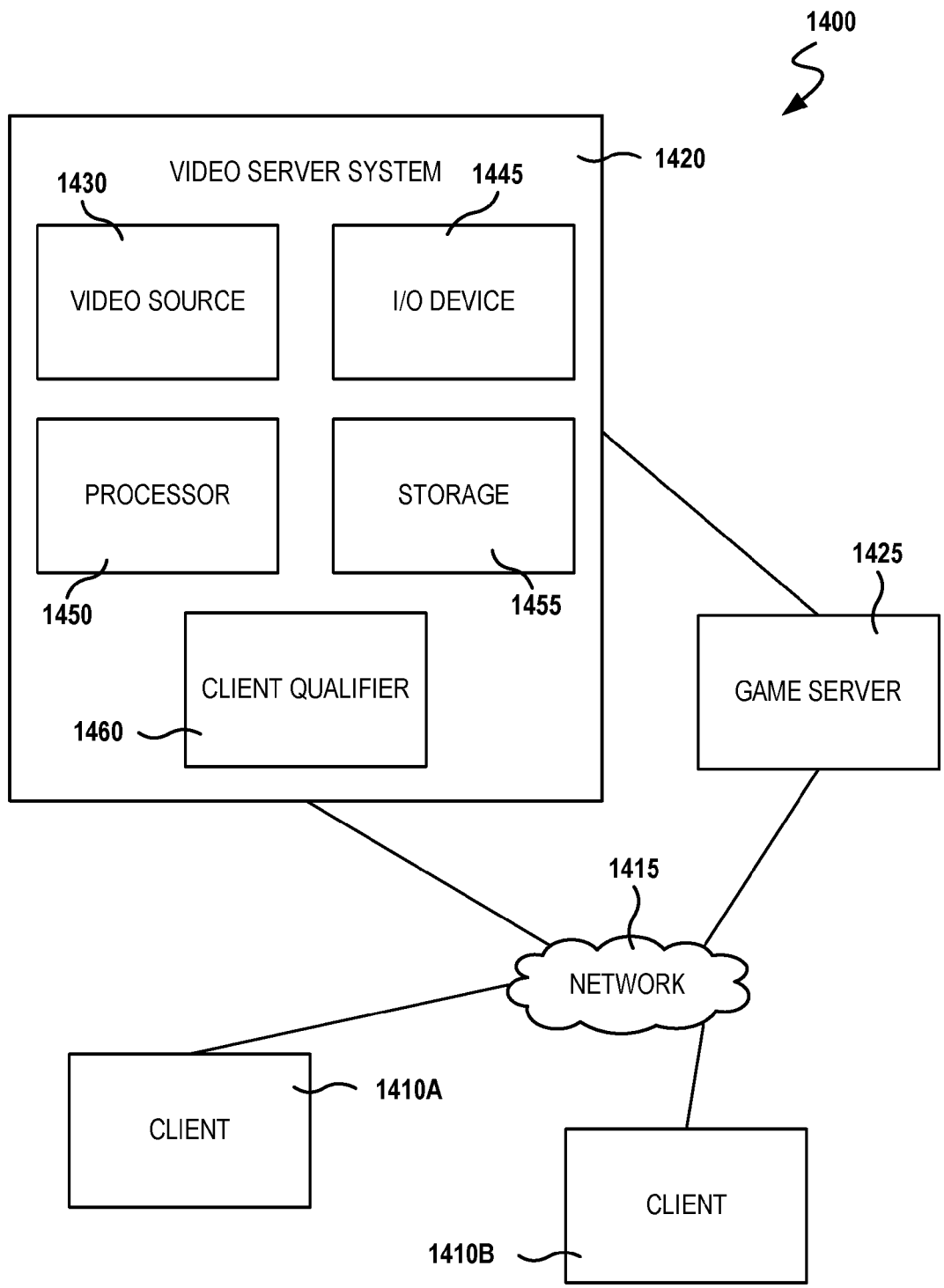
FIG. 13 is a block diagram of a Game System, according to various embodiments of the invention.

FIG. 13 is a block diagram of a Game System 1400, according to various embodiments of the invention. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the invention.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multi-player game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream, optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the present disclosure.

What is claimed is:

1. A system, comprising:
a peripheral device having a plurality of electromagnets;
a glove interface object, the glove interface object having one or more magnetic sensors configured to sense magnetic fields generated by the electromagnets to determine a location of the glove interface object in an interactive environment, the glove interface object further having one or more inertial sensors configured to detect an orientation of the glove interface object, the glove interface object further having a transmitter configured to transmit data derived from the magnetic sensors and the inertial sensors to a computing device for processing to generate data representing a pose of a virtual hand, the virtual hand capable of being rendered in a virtual environment presented on a head-mounted display;
wherein the plurality of electromagnets include a first set of electromagnets that are activated when the glove interface object moves within a predefined distance of the peripheral device, and a second set of electromagnets that are activated when the glove interface object moves beyond the predefined distance; and,
wherein the magnetic sensors sense the magnetic fields generated by the first set of electromagnets when the glove interface object moves within the predefined distance of the peripheral device, and wherein the magnetic sensors sense the magnetic fields generated by the second set of electromagnets when the glove interface object moves beyond the predefined distance.

2. The system of claim 1, wherein each magnetic sensor is configured to generate data indicating distances to each of the electromagnets when each of the electromagnets is activated.

3. The system of claim 2, wherein the plurality of magnetic sensors are respectively positioned at fingertip areas of the glove interface object.

4. The system of claim 1,
wherein the peripheral device is configured to control activation of the electromagnets in a time-division multiplexed arrangement; and,
wherein the glove interface object is configured to control the magnetic sensors to sense the magnetic fields respectively generated by each of the electromagnets during activation.

5. The system of claim 4, wherein the time-division multiplexed arrangement is defined by a repeated pattern of activation of the electromagnets that provides for activation of each of the electromagnets during separate time periods.

6. The system of claim 1, wherein the plurality of electromagnets includes at least three electromagnets that are positioned in a non-collinear arrangement.

7. The system of claim 1, wherein the one or more inertial sensors are selected from the group consisting of an accelerometer, a gyroscope, and a magnetometer.

8. The system of claim 1,
wherein when the glove interface object moves within the predefined distance of the peripheral device, the magnetic sensors are controlled to sense magnetic fields at a first sample rate, and the first set of electromagnets are controlled to be sequentially activated at a first frequency corresponding to the first sample rate; and,
wherein when the glove interface object moves beyond the predefined distance, the magnetic sensors are controlled to sense magnetic fields at a second sample rate less than the first sample rate, and the second set of electromagnets are controlled to be sequentially activated at a second frequency corresponding to the second sample rate.

9. The system of claim 1, wherein the glove interface object includes one or more electromagnets, and wherein the magnetic sensors are configured to sense magnetic fields generated by the electromagnets of the glove interface object.

10. A system, comprising:

a device having a plurality of emitters;

a glove interface object, the glove interface object having one or more sensors configured to sense signals generated by the emitters to determine a location of the glove interface object in an interactive environment, the glove interface object further having one or more inertial sensors configured to detect an orientation of the glove interface object, the glove interface object further having a transmitter configured to transmit data derived from the magnetic sensors and the inertial sensors to a computing device for processing to generate data representing a pose of a virtual hand, the virtual hand capable of being rendered in a virtual environment presented on a head-mounted display;

wherein the plurality of emitters include a first set of emitters that are activated when the glove interface object moves within a predefined distance of the device, and a second set of emitters that are activated when the glove interface object moves beyond the predefined distance; and, wherein the sensors sense the signals generated by the first set of emitters when the glove interface object moves within the predefined distance of the device, and wherein the sensors sense the signals generated by the second set of emitters when the glove interface object moves beyond the predefined distance.

11. The system of claim 10, wherein each sensor is configured to generate data indicating distances to each of the emitters when each of the emitters is activated.

12. The system of claim 10, wherein the device is configured to control activation of the emitters in a time-division multiplexed arrangement, wherein the time-division multiplexed arrangement is defined by a repeated pattern of activation of the emitters that provides for activation of each of the electromagnets during separate time periods; and, wherein the glove interface object is configured to control the sensors to sense the signals respectively generated by each of the emitters during activation.

13. The system of claim 10, wherein when the glove interface object moves within the predefined distance of the device, the sensors are controlled to sense signals at a first sample rate, and the first set of emitters are controlled to be sequentially activated at a first frequency corresponding to the first sample rate; and, wherein when the glove interface object moves beyond the predefined distance, the sensors are controlled to sense signals at a second sample rate less than the first sample rate, and the second set of emitters are controlled to be sequentially activated at a second frequency corresponding to the second sample rate.

14. A method, comprising:

activating a glove emitter positioned on a glove interface object;

using a proximity sensor positioned at a fingertip portion of the glove interface object to determine a proximity of the fingertip portion to the glove emitter;

in response to determining a location of the glove interface object within a predefined distance of a peripheral device, activating a peripheral emitter positioned at the peripheral device, and transitioning, from using the proximity sensor to determine the proximity of the fingertip portion to the glove emitter, to using the proximity sensor to determine a proximity of the fingertip portion to the peripheral emitter.

15. The method of claim 14, wherein transitioning includes terminating the activation of the glove emitters.

16. The method of claim 14, wherein determining the location of the glove interface object includes activating a secondary peripheral emitter on the peripheral device, and using the proximity sensor to determine a proximity of the fingertip portion to the secondary peripheral emitter; and, wherein transitioning includes terminating the activation of the secondary peripheral emitter.

17. The method of claim 14, wherein the glove emitter is positioned at a wrist portion of the glove interface object.

18. The method of claim 14, wherein the glove emitter and the peripheral emitter are electromagnets, and the proximity sensor is a magnetic sensor.

* * * * *